US012681167B2

(12) United States Patent
Hartmann et al.

(10) Patent No.: US 12,681,167 B2
(45) Date of Patent: Jul. 14, 2026

(54) RADAR METROLOGY SYSTEM

(71) Applicant: Mitutoyo Corporation, Kanagawa-ken (JP)

(72) Inventors: Nick Hartmann, Kirkland, WA (US); Ted Staton Cook, Kirkland, WA (US)

(73) Assignee: Mitutoyo Corporation, Kanagawa-Ken (JP)

( * ) Notice: Subject to any disclaimer, the term of this patent is extended or adjusted under 35 U.S.C. 154(b) by 369 days.

(21) Appl. No.: 17/710,607

(22) Filed: Mar. 31, 2022

(65) Prior Publication Data

US 2023/0314595 A1 Oct. 5, 2023

(51) Int. Cl.
 G01S 13/87 (2006.01)
 G01S 13/72 (2006.01)
 G01S 13/88 (2006.01)
(52) U.S. Cl.
 CPC .......... G01S 13/878 (2013.01); G01S 13/723 (2013.01); G01S 13/881 (2013.01)
(58) Field of Classification Search
 CPC ..... G01S 13/878; G01S 13/723; G01S 13/881
 See application file for complete search history.

(56) References Cited

U.S. PATENT DOCUMENTS

| | | | |
|---|---|---|---|
| 4,725,965 A | 2/1988 | Keenan | |
| 6,206,891 B1 | 3/2001 | Amir et al. | |
| 6,288,785 B1 | 9/2001 | Frantz et al. | |
| 7,486,224 B2 | 2/2009 | Ghaleb et al. | |

(Continued)

FOREIGN PATENT DOCUMENTS

| | | | | |
|---|---|---|---|---|
| DE | 102009042014 A1 * | 3/2011 | ............ | B25J 13/089 |
| RU | 239 845 C2 | 11/2004 | | |

OTHER PUBLICATIONS

"Broyden-Fletcher-Goldfarb-Shanno algorithm," Wikipedia, archived May 7, 2021, URL=https://en.wikipedia.org/w/index.php?title=Broyden-Fletcher-Goldfarb-Shanno_algorithm&oldid=1021885250, download date Mar. 24, 2022. (5 pages).

(Continued)

*Primary Examiner* — Resha Desai
*Assistant Examiner* — Brandon James Henson
(74) *Attorney, Agent, or Firm* — Seed Intellectual Property Law Group LLP

(57) ABSTRACT

A radar metrology system is provided for use with a movement system (e.g., a robot arm) that moves an end tool, and includes mobile and stationary radar configurations. The mobile radar configuration includes mobile radar components that are coupled to the end tool or an end tool mounting configuration. The stationary radar configuration includes stationary radar components (e.g., which define a metrology frame volume that surrounds a movement volume in which the end tool is moved). Distances are determined between stationary radar components and mobile radar components based at least in part on radar signals, wherein the distances indicate (e.g., and may be utilized to determine) a position and orientation (e.g., of the mobile radar configuration and/or end tool). The radar signals are either transmitted from stationary radar components and received by mobile radar components, or transmitted from mobile radar components and received by stationary radar components.

23 Claims, 22 Drawing Sheets

(56) References Cited

U.S. PATENT DOCUMENTS

| | | | |
|---|---|---|---|
| 7,804,981 B2 | 9/2010 | Viggiano et al. | |
| 8,014,791 B2 | 9/2011 | Guigne et al. | |
| 8,344,948 B2 | 1/2013 | Hol et al. | |
| 9,188,430 B2 | 11/2015 | Atwell et al. | |
| 9,482,524 B2 | 11/2016 | Metzler et al. | |
| 9,529,082 B1 | 12/2016 | Rikoski | |
| 9,703,002 B1* | 7/2017 | Olsson | G01V 3/12 |
| 9,939,522 B2 | 4/2018 | Hong et al. | |
| 10,048,379 B2 | 8/2018 | Markendorf et al. | |
| 10,107,892 B2 | 10/2018 | Fireaizen et al. | |
| 10,285,760 B2 | 5/2019 | Sadjadi et al. | |
| 10,335,116 B2 | 7/2019 | Boctor et al. | |
| 10,495,726 B2 | 12/2019 | Pusch et al. | |
| 2005/0154548 A1 | 7/2005 | Basel et al. | |
| 2018/0239010 A1* | 8/2018 | Mindell | G01S 13/34 |
| 2021/0389411 A1 | 12/2021 | Lipka et al. | |
| 2021/0389439 A1 | 12/2021 | Sumi et al. | |

OTHER PUBLICATIONS

"CMA-ES," Wikipedia, archived Feb. 16, 2022, URL=https://en.wikipedia.org/w/index.php?title=CMA-ES&oldid=1072233605, download date Mar. 24, 2022. (14 pages).

"Decca Navigator System," Wikipedia, archived May 18, 2022, URL=https://en.wikipedia.org/w/index.php?title=Decca_Navigator_System&oldid=1088483921. (11 pages).

"Fibonacci number," Wikipedia, archived Sep. 22, 2021, URL=https://en.wikipedia.org/w/index.php?title=Fibonacci_number&oldid=1045761459. (13 pages).

Foxlin, "Generalized Architecture for Simultaneous Localization, Auto-Calibration, and Map-building," IEEE/RSJ Conf. on Intelligent Robots and Systems, Lausanne, Switzerland, Oct. 2-4, 2002. (7 pages).

Geyer, "Earth-Referenced Aircraft Navigation and Surveillance Analysis," Project Memorandum, DOT-VNTSC-FAA-16-12, Prepared for: Federal Aviation Administration Wake Turbulence Research Office, Jun. 2016. (274 pages).

Koelpin et al. "Six-Port Based Interferometry for Precise Radar and Sensing Applications," Sensors 16(1556):1-26, 2016.

"Multilateration," Wikipedia, archived May 18, 2022, URL=https://en.wikipedia.org/w/index.php?title=Multilateration&oldid=1088547356. (13 pages).

Piotrowsky et al. "Enabling High Accuracy Distance Measurements With FMCW Radar Sensors," IEEE Transactions on Microwave Theory and Techniques 67(12):5360-5371, Dec. 2019.

"Powell's method," Wikipedia, archived Jun. 8, 2021, URL=https://en.wikipedia.org/w/index.php?title=Powell%27s_method&oldid=1027477070, download date Mar. 24, 2022. (2 pages).

"Simultaneous localization and mapping," Wikipedia, archived Feb. 11, 2022, URL=https://en.wikipedia.org/w/index.php?title=Simultaneous_localization_and_mapping&oldid=1071292343, download date Mar. 25, 2022. (10 pages).

Sirola, "Closed-form Algorithms in Mobile Positioning: Myths and Misconceptions," 2010 7th Workshop on Positioning, Navigation and Communication, 2010, pp. 38-44.

Tatu et al. "Millimeter Wave Multi-Port Interferometric Radar Sensors: Evolution of Fabrication and Characterization Technologies," Sensors 20(5477):1-44, 2020.

* cited by examiner

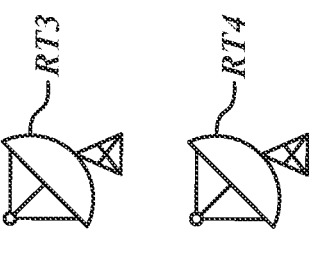
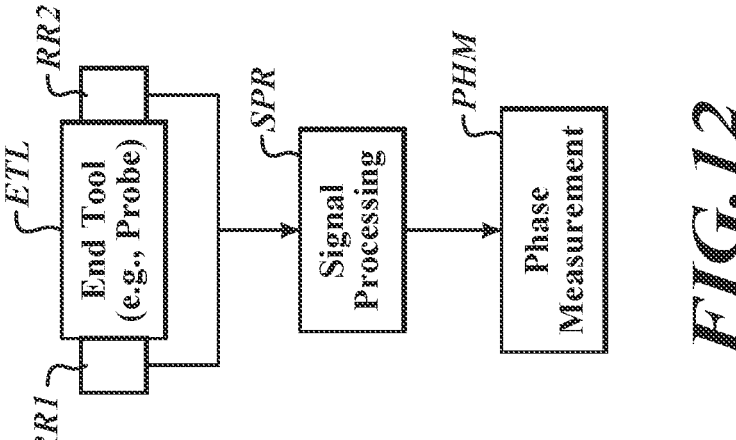
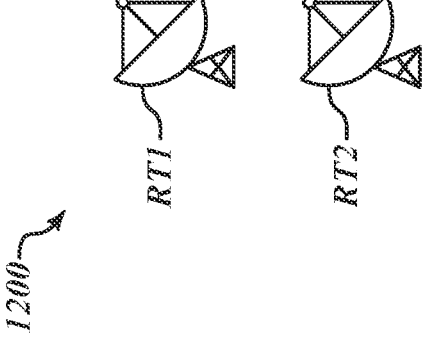
*FIG. 12*

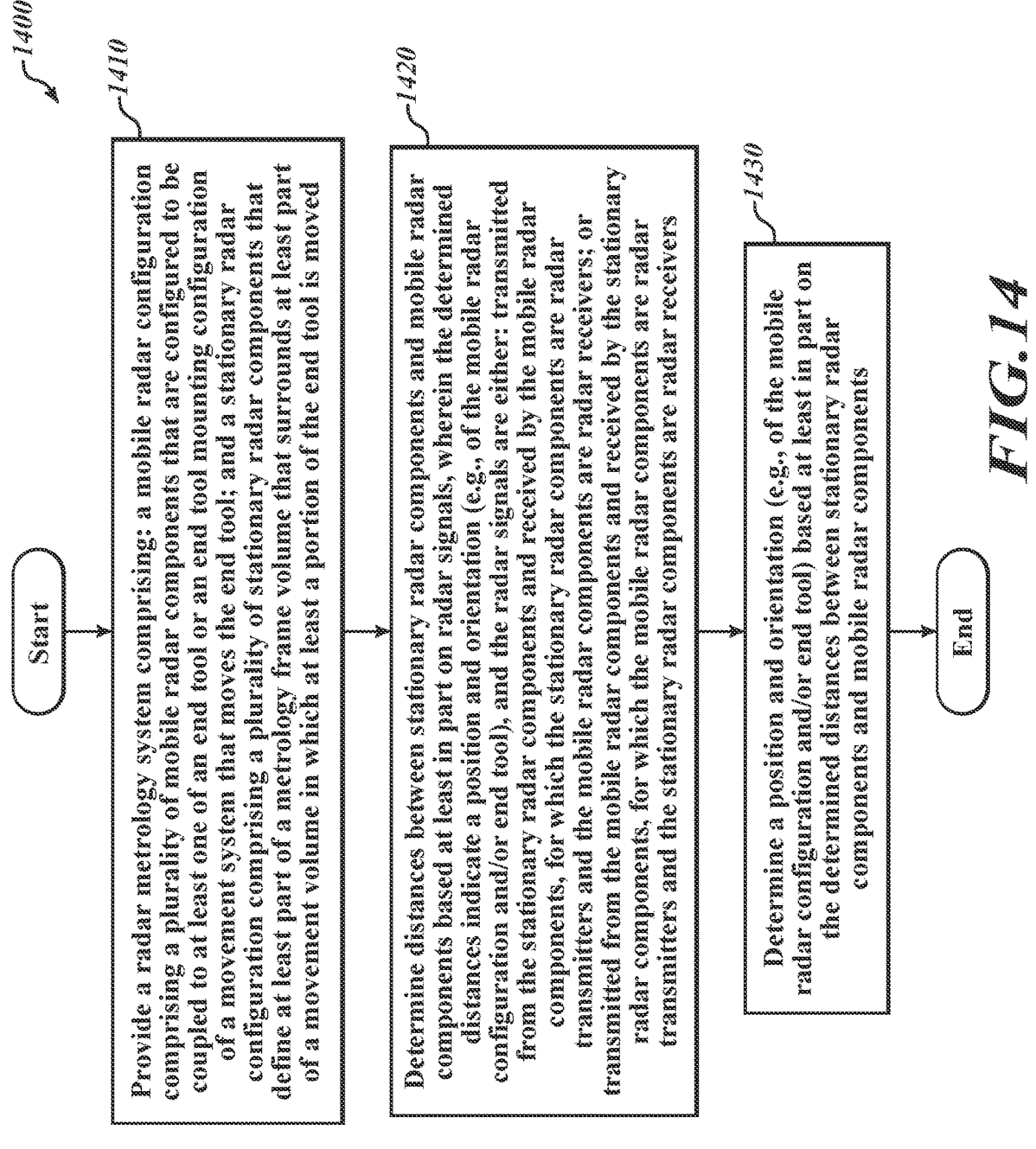

Start

Provide a radar metrology system comprising: a mobile radar configuration comprising a plurality of mobile radar components that are configured to be coupled to at least one of an end tool or an end tool mounting configuration of a movement system that moves the end tool; and a stationary radar configuration comprising a plurality of stationary radar components that define at least part of a metrology frame volume that surrounds at least part of a movement volume in which at least a portion of the end tool is moved Determine distances between stationary radar components and mobile radar components based at least in part on radar signals, wherein the determined distances indicate a position and orientation (e.g., of the mobile radar configuration and/or end tool), and the radar signals are either: transmitted from the stationary radar components and received by the mobile radar components, for which the stationary radar components are radar transmitters and the mobile radar components are radar receivers; or transmitted from the mobile radar components and received by the stationary radar components, for which the mobile radar components are radar transmitters and the stationary radar components are radar receivers Determine a position and orientation (e.g., of the mobile radar configuration and/or end tool) based at least in part on the determined distances between stationary radar components and mobile radar components End

FIG.14

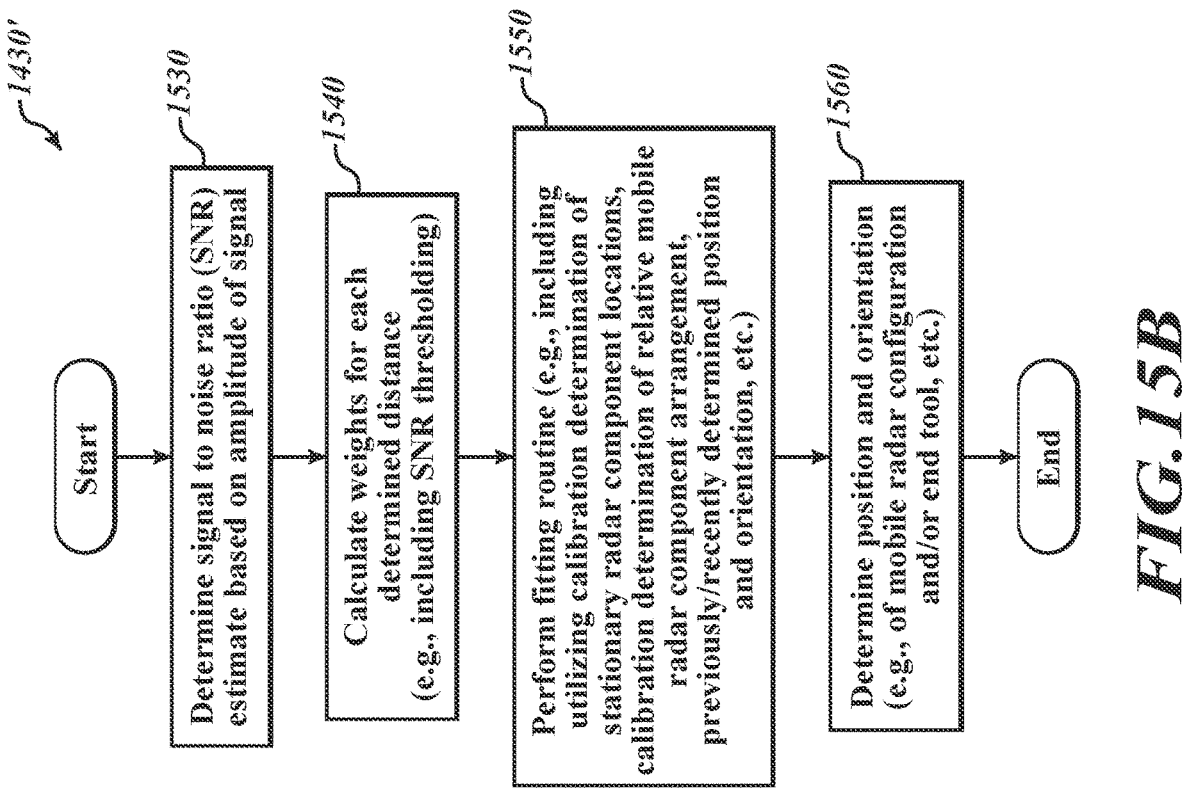

1430'

Start

1530
Determine signal to noise ratio (SNR) estimate based on amplitude of signal 1540
Calculate weights for each determined distance (e.g., including SNR thresholding)

1550
Perform fitting routine (e.g., including utilizing calibration determination of stationary radar component locations, calibration determination of relative mobile radar component arrangement, previously/recently determined position and orientation, etc.)

1560
Determine position and orientation (e.g., of mobile radar configuration and/or end tool, etc.)

End

Start

1510
Perform phase unwrapping (e.g., using coarse position information to determine number of wavelengths of radar signal)

1520
Determine distances (e.g., based at least in part on coarse position and phase, etc.)

End

*FIG. 15A*

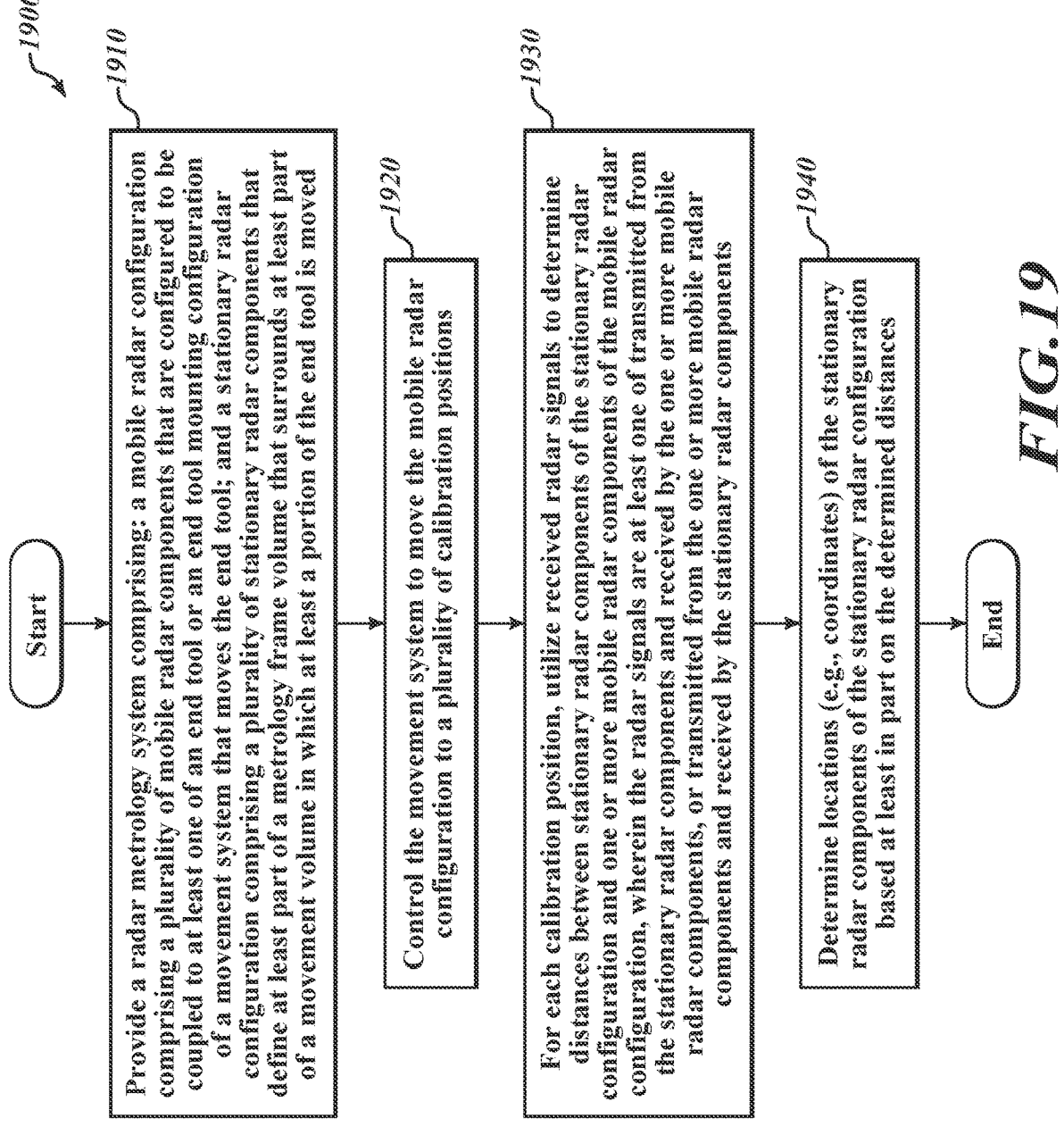

*1900*

Start

1910

Provide a radar metrology system comprising: a mobile radar configuration comprising a plurality of mobile radar components that are configured to be coupled to at least one of an end tool or an end tool mounting configuration of a movement system that moves the end tool; and a stationary radar configuration comprising a plurality of stationary radar components that define at least part of a metrology frame volume that surrounds at least part of a movement volume in which at least a portion of the end tool is moved

1920

Control the movement system to move the mobile radar configuration to a plurality of calibration positions

1930

For each calibration position, utilize received radar signals to determine distances between stationary radar components of the stationary radar configuration and one or more mobile radar components of the mobile radar configuration, wherein the radar signals are at least one of transmitted from the stationary radar components and received by the one or more mobile radar components, or transmitted from the one or more mobile radar components and received by the stationary radar components

1940

Determine locations (e.g., coordinates) of the stationary radar components of the stationary radar configuration based at least in part on the determined distances End

*FIG. 19*

RADAR METROLOGY SYSTEM

BACKGROUND

Technical Field

This disclosure relates to metrology and movement systems, and more particularly to a metrology system that may be utilized with a movement system, such as a robot, for tracking position and orientation.

Description of the Related Art

Manufacturing, workpiece inspection, and other processes frequently use mechanical movement systems for performing certain functions. For example, robot systems or other movement systems may be utilized to move an end tool for performing certain operations (e.g., in relation to workpiece inspection, manufacturing, etc.). For certain applications, various types of robots that may be utilized include articulated robots, selective compliance articulated robot arm (SCARA) robots, Cartesian robots, cylindrical robots, spherical robots, etc. As one example of components that may be included in a robot, a SCARA robot system (e.g., which may be a type of articulated robot system) may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy on the order of hundreds or thousands of microns, as limited by certain factors (e.g., the rotary encoder performance in combination with the mechanical stability of the robot system, etc.).

U.S. Pat. No. 4,725,965 (referred to herein as the '965 patent), which is hereby incorporated herein by reference in its entirety, discloses certain calibration techniques for improving the accuracy of a SCARA system. As described in the '965 patent, a technique is provided for calibrating a SCARA type robot comprising a first rotatable arm portion and a second rotatable arm portion which carries an end tool. The calibration technique is in relation to the fact that the SCARA robot may be controlled using a kinematic model, which, when accurate, allows the arm portions to be placed in both a first and second angular configuration at which the end tool carried by the second arm portion remains at the same position. To calibrate the kinematic model, the arm portions are placed in a first configuration to locate the end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.). A system that can provide improvements with regard to such issues (e.g., for increasing the reliability, repeatability, speed, etc., of position and orientation determination for processes such as workpiece measurements, manufacturing, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A radar metrology system is provided for use with a movement system that moves an end tool. The movement system includes a movable mechanical configuration and a motion control system. The movable mechanical configuration includes an end tool mounting configuration that an end tool (e.g., a probe) is configured to mount to. The motion control system is configured to control an end tool position and orientation, based at least in part on controlling the movable mechanical configuration so as to move at least a portion of an end tool that is mounted to the end tool mounting configuration within a movement volume. The radar metrology system includes a mobile radar configuration and a stationary radar configuration. The mobile radar configuration includes a plurality of mobile radar components that are configured to be coupled to at least one of the end tool or the end tool mounting configuration. The stationary radar configuration includes a plurality of stationary radar components that define at least part of a metrology frame volume that surrounds at least part of the movement volume in which at least a portion of the end tool is moved.

In various implementations, distances are determined (e.g., by the radar metrology system, or more specifically by a processing portion of the system). The determined distances are between stationary radar components and mobile radar components (e.g., wherein each distance is between a respective pair, including a respective stationary radar component and a respective mobile radar component). The distances are determined based at least in part on radar signals (e.g., including a radar signal transmitted and received between each respective pair), wherein the determined distances indicate a position and orientation (e.g., of the mobile radar configuration and/or end tool). In various implementations, the radar signals are either: transmitted from the stationary radar components and received by the mobile radar components, for which the stationary radar components are radar transmitters and the mobile radar components are radar receivers; or transmitted from the mobile radar components and received by the stationary radar components, for which the mobile radar components are radar transmitters and the stationary radar components are radar receivers.

In various implementations, a calibration process may be performed (e.g., by the radar metrology system, or more specifically by a processing portion of the system). As part of the calibration process, the movement system is controlled to move the mobile radar configuration to a plurality of calibration positions. For each calibration position, received radar signals are utilized to determine distances between stationary radar components of the stationary radar configuration and one or more mobile radar components of the mobile radar configuration. The radar signals are at least one of transmitted from the stationary radar components and received by the one or more mobile radar components, or transmitted from the one or more mobile radar components and received by the stationary radar components. The locations (e.g., coordinates) of the stationary radar components of the stationary radar configuration are determined based at least in part on the determined distances.

BRIEF DESCRIPTION OF THE SEVERAL VIEWS OF THE DRAWINGS

FIG. 12 is a diagram illustrating an implementation of a radar metrology system utilizing antenna multiplexing;

FIG. 14 is a flow diagram illustrating an exemplary implementation of a routine for operating a radar metrology system;

FIGS. 15A and 15B are flow diagrams illustrating routines for implementing certain portions of the routine of FIG. 14;

FIG. 19 is a flow diagram illustrating an exemplary implementation of a routine for performing a calibration process for a radar metrology system.

DETAILED DESCRIPTION

Figure 1:
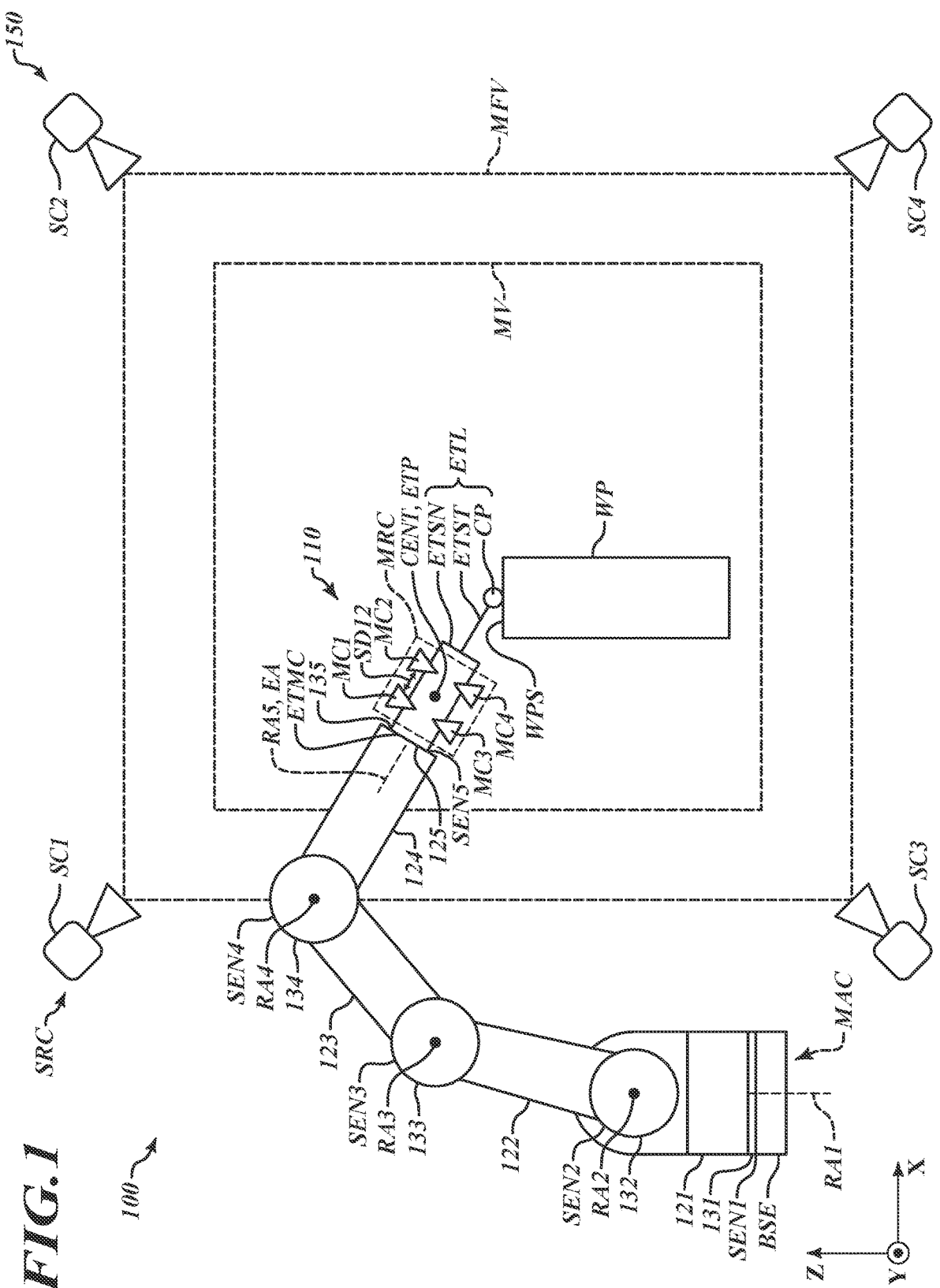
FIG. 1 is a block diagram of a first exemplary implementation of a movement and metrology system.
Figure 2:
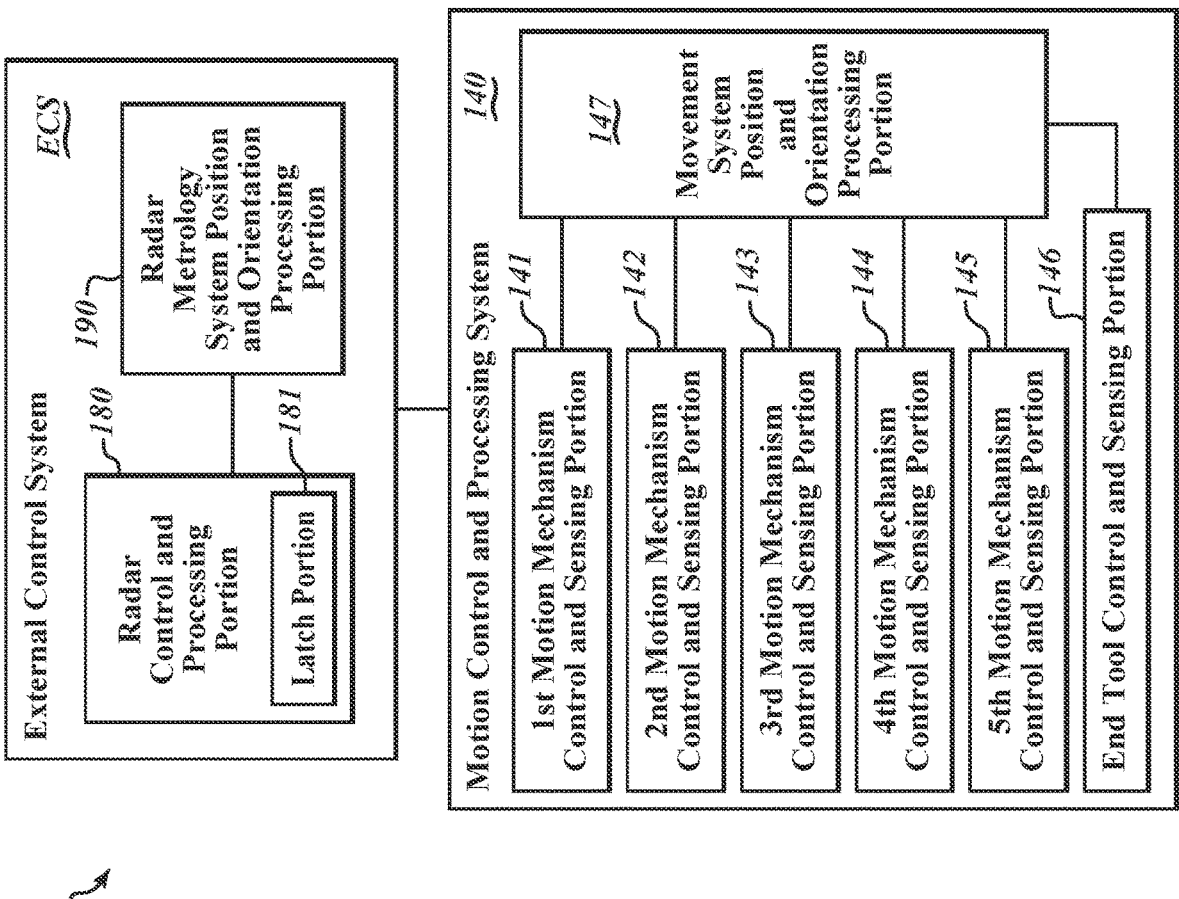
FIG. 2 is a block diagram of control and processing portions of the system of FIG. 1.

FIG. 1 is a block diagram of a first exemplary implementation of a movement and metrology system 100 including a movement system 110 and a radar metrology system 150. The movement system 110 (e.g., an articulated robot) includes a movable mechanical configuration MAC (e.g., a movable arm configuration) and a motion control and processing system 140 (e.g., as illustrated in FIG. 2). The radar metrology system 150 includes a stationary radar configuration SRC, a mobile radar configuration MRC, a radar control and processing portion 180, and a radar metrology system position and orientation processing portion 190 (e.g., as illustrated in FIG. 2). In the configuration of FIG. 1, the mobile radar configuration MRC is coupled to the end tool ETL. Orthogonal X, Y and Z axes are indicated (e.g., as corresponding to a coordinate system for and/or of the radar metrology system 150 and/or movement system 110).

As will be described in more detail below, the radar metrology system 150 may be utilized for tracking a position and orientation (e.g., of the end tool ETL as moved by the movement system 110). In various implementations, the radar metrology system 150 may be utilized for six degrees of freedom (6DoF) tracking (e.g., of a position and orientation of an end tool ETL) based on radar technology (e.g., in some instances utilizing millimeter waves) with high precision (e.g., micron level precision over a meter or more of distance). As will be further be described in more detail below, in various implementations, the radar metrology system 150 includes a stationary radar configuration SRC with an arrangement of stationary radar components SC (e.g., radar transmitters) surrounding a movement volume MV (e.g., in which an end tool ETL is moved). A mobile radar configuration MRC includes mobile radar components MC (e.g., radar receivers) and is coupled to at least one of the end tool ETL or an end tool mounting configuration ETMC (e.g., of the movement system 110), and for which movement of the mobile radar configuration MRC and correspondingly the end tool ETL is tracked (e.g., based on distances determined from radar signals between the stationary radar components SC and mobile radar components MC).

In various implementations, the radar signals establish direct links (e.g., direct radar links) between the stationary radar components SC and the mobile radar components MC without relying on reflections/reflected radar signals (i.e., such as are utilized by certain previous radar systems). In various implementations, prior knowledge (e.g., as previously known or determined) of the arrangement of mobile radar components MC within the mobile radar configuration MRC (e.g., including the relative positions, spacing, orientations, etc.) and of the relative locations of the stationary radar components SC within the stationary radar configuration SRC may be utilized as part of the processing (e.g., as performed by a processing portion of the system). For example, such processing may combine the information from individually determined distances (e.g., determined from radar signals between the radar components) to determine a position and orientation of the mobile radar configuration MRC and correspondingly the end tool ETL with a high level of accuracy (e.g., for which each of the individually determined distances by themselves may not be sufficient for determining a position of an individual radar component). In various implementations, a processing portion (e.g., processing portion 190 of FIG. 2) of the radar metrology system 150 determines the location and orientation of the mobile radar configuration MRC (i.e., including the arrangement of mobile radar components MC), and correspondingly any attached object (e.g., the end tool ETL) in 3-dimensional space in a corresponding coordinate system (e.g., as may be referenced to the stationary radar components SC of the stationary radar configuration SRC, or otherwise, and which in some instances may be referred to as a radar coordinate system).

In various implementations, a radar coordinate system may be referenced in terms of a 3-dimensional coordinate system (e.g., a Cartesian coordinate system, a cylindrical coordinate system, etc.) For example, in some implementations the 3-dimensional positions of the mobile radar components, stationary radar components, end tool ETL and/or contact point CP of the end tool may be referenced in terms of X, Y, Z coordinates of the radar coordinate system and/or a machine coordinate system (e.g., of the movement system) and/or of a workpiece coordinate system (e.g., as referenced to features of a workpiece WP that is being measured). In some implementations, the 3-dimensional positions may initially be determined/represented in terms of coordinates of the radar coordinate system (i.e., in accordance with the distance determining operations as described herein), but may then be converted to coordinates in a workpiece coordinate system, or machine coordinate system, or otherwise.

In various implementations, the radar metrology system 150 may be utilized to improve the precision of movement systems with moveable mechanical configurations MAC (e.g., robot arms, for which uncalibrated robot arm accuracy may otherwise typically have accuracy on the millimeter level, while the radar metrology system may provide accuracy on the micron level). Some other example applications include utilizing the radar metrology system for performing calibration on a moveable mechanical configuration MAC (e.g., a robot arm) or other applications in which it may be desirable to track the position and orientation of the mobile radar configuration MRC within the movement volume MV.

In the specific example of FIG. 1, the movable mechanical configuration MAC includes a lower base portion BSE, arm portions 121-125, motion mechanisms 131-135, position sensors SEN1-SEN5, and an end tool mounting configuration ETMC. In various implementations, some or all of the arm portions 121-125 may be mounted to respective motion mechanisms 131-135 at respective proximal ends of the respective arm portions 121-125. In the example of FIG. 1, some or all of the motion mechanisms 131-135 (e.g., rotary joints with corresponding motors) may enable motion (e.g., rotation) of the respective arm portions 121-125 (e.g., about respective rotary axes RA1-RA5). In various implementations, the position sensors SEN1-SEN5 (e.g., rotary encoders) may be utilized for determining the positions (e.g., angular orientations) of the respective arm portions 121-125. In various implementations, the arm portion 125 may be partially or fully contained inside the arm portion 124 (e.g., may rotate within and/or at the distal end of the arm portion 124).

In various implementations, the movable mechanical configuration MAC may have a portion that is designated as a terminal portion (e.g., the fifth arm portion 125). In the example configuration of FIG. 1, the end tool mounting configuration ETMC is located proximate to (e.g., located at) the distal end of the fifth arm portion 125 (e.g., designated as the terminal portion), which corresponds to a distal end of the movable mechanical configuration MAC. In various implementations, a terminal portion of a movable mechanical configuration may be an element 125 (e.g., a rotatable element, etc.) for which at least part of the terminal portion corresponds to a distal end of the movable mechanical configuration MAC where the end tool mounting configuration ETMC is located.

In various implementations, the end tool mounting configuration ETMC may include various elements for coupling and maintaining the end tool ETL proximate to the distal end of the movable mechanical configuration MAC. For example, in various implementations, the end tool mounting configuration ETMC may include an autojoint connection, a magnetic coupling portion and/or other coupling elements as are known in the art for mounting an end tool ETL to a corresponding element. The end tool mounting configuration ETMC may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and an end tool stylus ETST with a contact point CP (e.g., for contacting a surface of a workpiece WP). The fifth motion mechanism 135 is located proximate to the distal end of the fourth arm portion 124. In various implementations, the fifth motion mechanism 135 (e.g., a rotary joint with a corresponding motor) may be configured to rotate the fifth arm portion 125 and/or end tool ETL about a rotary axis RA5/end tool axis EA. In some implementations, the fifth motion mechanism 135 may also or alternatively include a different type of motion mechanism (e.g., a linear actuator) that is configured to move the fifth arm portion 125 and/or end tool ETL linearly (e.g., relative to the distal end of the fourth arm portion 124, such as into and out of the distal end of the fourth arm portion 124). In any case, the end tool ETL is mounted to (e.g., coupled to) the end tool mounting configuration ETMC, and has a corresponding end tool position ETP with corresponding coordinates (e.g., x, y and z coordinates). In various implementations, the end tool position ETP may correspond to or be proximate to the position of the end tool mounting configuration ETMC (e.g., at or proximate to the distal end of the fifth arm portion 125, which may correspond to the distal end of the movable mechanical configuration MAC).

FIG. 2 is a block diagram of control and processing portions 200 of the system of FIG. 1, which include a motion control system 140 (e.g., which may also be a processing system) and which include at least portions of an external control system ECS (e.g., including a radar control system). Those skilled in the art will appreciate that the control systems 140 and ECS and/or other control systems or components thereof as described or usable with the elements and methods described herein may generally be implemented using any suitable computing system or device, including distributed or networked computing environments, and the like. Such computing systems or devices may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The motion control and processing system 140 is configured to control the end tool position ETP of the end tool ETL with a level of accuracy defined as a movement system accuracy. More specifically, the motion control and processing system 140 is generally configured to control the coordinates (e.g., x, y and z coordinates) of the end tool position ETP with the movement system accuracy based at least in part on utilizing the motion mechanisms 131-135 and position sensors SEN1-SEN5 for sensing and controlling the positions of the arm portions 121-125. In various implementations, the motion control and processing system 140 may include motion mechanism control and sensing portions 141-145 that may respectively receive signals from the respective position sensors SEN1-SEN5, for sensing the positions (e.g., angular positions, linear positions, etc.) of the respective arm portions 121-125, and/or may provide control signals to the respective motion mechanisms 131-135 (e.g., including motors, linear actuators, etc.) for moving the respective arm portions 121-125.

The motion control and processing system 140 may also receive signals from the end tool sensing portion ETSN. In various implementations, the end tool sensing portion ETSN may include circuitry and/or configurations related to the operations of the end tool ETL (e.g., for sensing a workpiece WP, etc.). As will be described in more detail below, in various implementations, the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN, which may provide corresponding signals to the motion control and processing system 140. In various implementations, the motion control and processing system 140 may include an end tool control and sensing portion 146 that may provide control signals to and/or receive sensing signals from the end tool sensing portion ETSN. In various implementations, the end tool control and sensing portion 146 and the end tool sensing portion ETSN may be merged and/or indistinguishable.

In various implementations, the motion mechanism control and sensing portions 141-145 and the end tool control and sensing portion 146 may all provide outputs to and/or receive control signals from a movement system position and orientation processing portion 147 which may control and/or determine the overall positioning and orientation of the movable mechanical configuration MAC of the movement system 110 and corresponding position and orientation of the end tool ETL as part of the motion control and processing system 140. In various implementations, the position of the end tool ETL may be referenced as the end tool position ETP. In general, the motion control system 140 is configured to control the end tool position and orientation, based at least in part on controlling the movable mechanical configuration MAC so as to move at least a portion of the end tool ETL that is mounted to the end tool mounting configuration ETMC within a movement volume MV.

In various implementations, the radar metrology system 150 may be included with or otherwise added to a movement system 110 (e.g., as part of a retrofit configuration for being added to an existing movement system 110, etc.). In general, the radar metrology system 150 may be utilized to provide a determination of the position and orientation of the end tool ETL (e.g., with an improved level of accuracy relative to the accuracy of the movement system 110). More specifically, as will be described in more detail below, the radar metrology system 150 may be utilized to determine a position and orientation of the end tool ETL (e.g., based at least in part on the determined distances D between stationary radar components SC and mobile radar components MC), with an accuracy level that is better than the movement system accuracy.

Figure 8A:
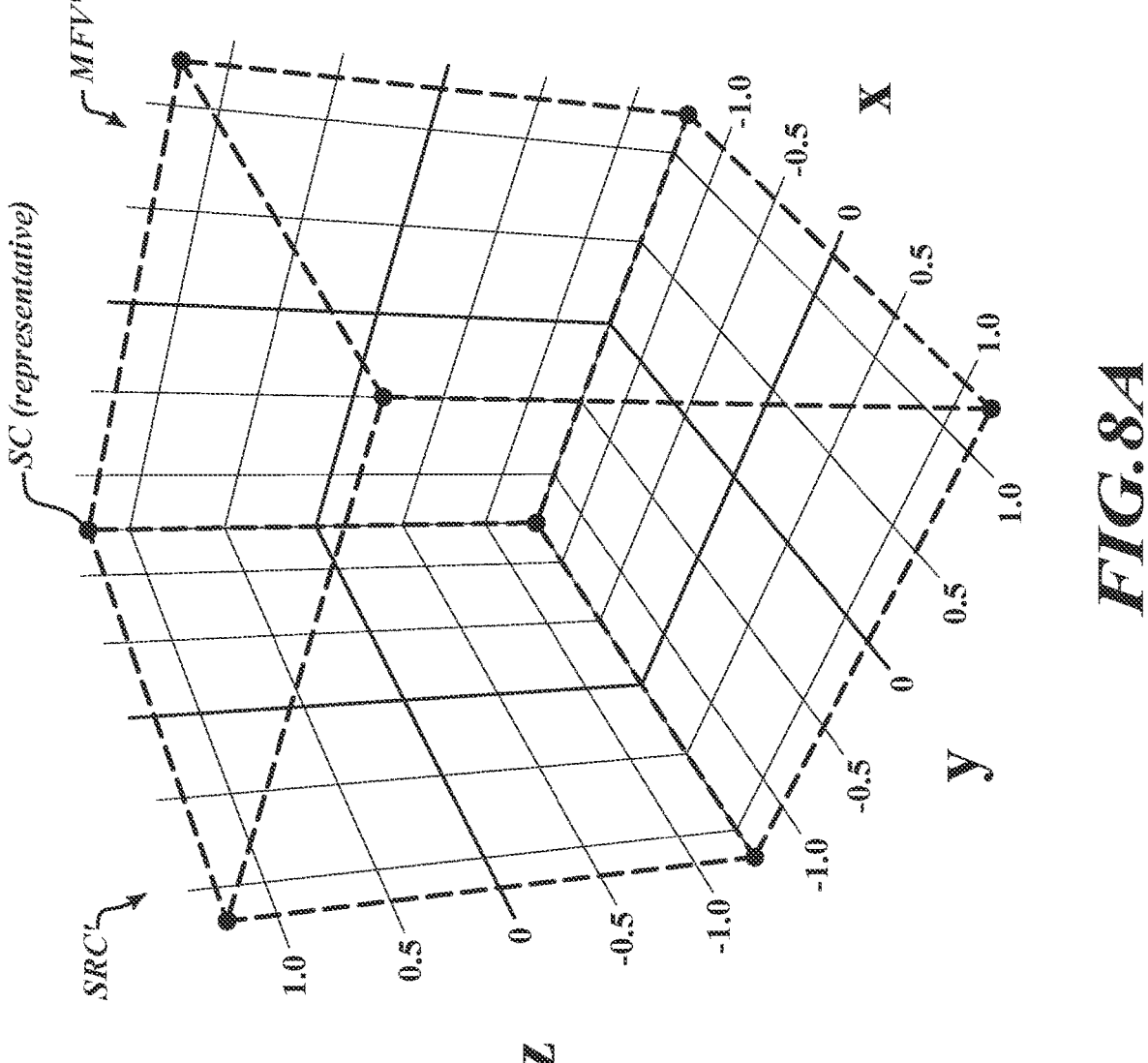
FIGS. 8A and 8B are diagrams of stationary radar configurations including stationary radar components that each define at least part of a metrology frame volume.
Figure 8B:
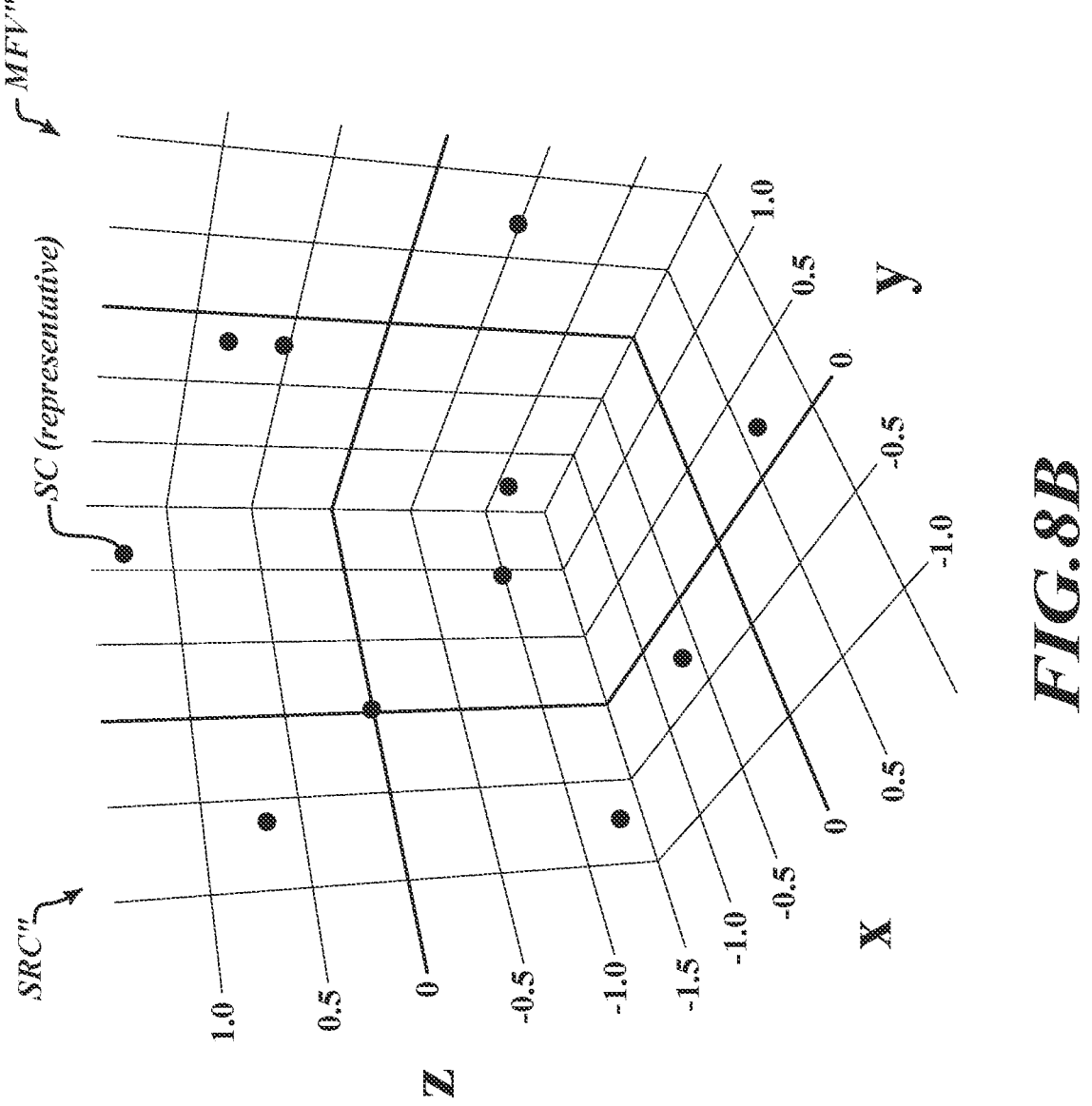

The stationary radar configuration SRC of the radar metrology system 150 includes stationary radar components SC1-SC4 (e.g., as will be described in more detail below). The stationary radar components SC1-SC4 are located at fixed locations/positions (e.g., as may each be located on a frame, wall or other structure, etc.) which at least in part define the metrology frame volume MFV. In FIG. 1, the stationary radar components S1-S4 are shown as defining four corners of a metrology frame volume MFV that surrounds at least part of the movement volume MV in which at least a portion of the end tool ETL is moved. As will be described in more detail below, in various implementations, a stationary radar configuration may include various numbers of stationary radar components. For example, in some cases a stationary radar configuration may include at least three stationary radar components (e.g., as a minimum number required for determining positioning/coordinates in 3-dimensional space). As other examples, a stationary radar configuration may include a number of stationary radar components that at least partially define a metrology frame volume with a specified shape (e.g., as will be described in more detail below, FIGS. 8A and 8B illustrate 3-dimensional representations of stationary radar configurations with stationary radar components that at least partially define a metrology frame volume that has a cubical shape and spherical shape, respectively).

The mobile radar configuration MRC includes mobile radar components MC1-MC4 and is configured to be coupled to at least one of the end tool ETL or the end tool mounting configuration ETMC. In various implementations, each of the individual mobile radar components MC and/or a frame of the mobile radar configuration that holds the mobile radar components MC, may be fixedly attached or otherwise physically/mechanically coupled to the end tool ETL or the end tool mounting configuration ETMC. It will be appreciated that when the end tool ETL is coupled to the end tool mounting configuration ETMC, the mobile radar configuration MRC is then coupled to both the end tool ETL and the end tool mounting configuration ETMC. The position and orientation of the mobile radar configuration MRC are indicative of the position and orientation of the end tool ETL, as will be described in more detail below. In various implementations, it may be desirable to fixedly attach the mobile radar components MC to be proximate to the end tool ETL (e.g., as close as possible) to achieve high accuracy for the tracking of the position and orientation of the end tool ETL.

In various implementations, a processing portion (e.g., position and orientation processing portion 190) is configured to determine distances D (e.g., as will be illustrated and described in more detail below with respect to FIGS. 3-6) between stationary radar components SC (e.g., including at least some of the stationary radar components SC1-SC4) and mobile radar components MC (e.g., including at least some of the mobile radar components MC1-MC4) based at least in part on radar signals, wherein the determined distances indicate a position and orientation of the mobile radar configuration MRC, and correspondingly of the end tool ETL. In certain implementations, the radar signals may be transmitted from the stationary radar components SC and received by the mobile radar components MC, for which the stationary radar components SC are radar transmitters and the mobile radar components MC are radar receivers. In certain other implementations, the radar signals may be transmitted from the mobile radar components MC and received by the stationary radar components SC, for which the mobile radar components MC are radar transmitters and the stationary radar components SC are radar receivers. In some implementations, the stationary radar components SC and/or mobile radar components MC may include both radar transmitters and radar receivers.

In various implementations, a processing portion (e.g., position and orientation processing portion 190) may be configured to determine a position and orientation of the mobile radar configuration MRC, and correspondingly of the end tool ETL (i.e., which has a known fixed spatial relationship relative to the mobile radar configuration MRC), based at least in part on the determined distances between stationary radar components SC and mobile radar components MC. In various implementations, the stationary radar components SC and/or mobile radar components MC may include directive antennas (e.g., horn antennas) or phased arrays (e.g., for improved signal-to-noise ratios (SNR)/less background noise from reflections in the environment, and/or for which in some implementations the directional relationships may further be utilized as part of determinations of which radar transmitter a radar signal is received from by a respective radar receiver, etc.)

In various implementations, the movement volume MV consists of a volume in which at least a portion of at least one of the end tool ETL and/or the mobile radar configuration MRC may be moved. In the example of FIG. 1, the movement volume MV may be regarded as at least including a volume in which the contact point CP of the end tool ETL may be moved when inspecting a workpiece. As another example, the movement volume MV may also or alternatively be regarded as including a volume in which the mobile radar configuration MRC may move when the end tool ETL is moved for inspecting a workpiece. In various implementations, the movement system 110 is configured to move the movable mechanical configuration MAC so as to move at least a portion of an end tool ETL (e.g., including the contact point CP) that is mounted to the end tool mounting configuration ETMC along at least two dimensions (e.g., x and y dimensions) in the movement volume MV. In the example of FIG. 1, the portion of the end tool ETL (e.g., the contact point CP) is movable by the movement system 110 along three dimensions (e.g., x, y and z dimensions), such as for contacting a workpiece surface (e.g., workpiece surface WPS, WPS' or WPS" of FIGS. 3-6) of a workpiece to be measured.

In various implementations, a latch portion 181 and/or the radar control and processing portion 180 and/or the radar metrology system position and orientation processing portion 190 may be included as part of an external control system ECS (e.g., as part of an external computer, etc.). The radar control and processing portion 180 may provide power and/or control signals to the stationary radar configuration SRC (e.g., including the stationary radar components SC) and/or the mobile radar configuration MRC (e.g., including the mobile radar components MC). The radar metrology system position and orientation processing portion 190 may receive and/or process radar signals (e.g., as received by and from the mobile radar components MC or the stationary radar components SC).

The latch portion 181 may be included as part of the radar control and processing portion 180. In various implementations, the latch portion 181 is configured to input at least one input signal (e.g., that is related to the end tool position ETP) and to determine the timing of a trigger signal based on the at least one input signal, and to output the trigger signal to at least one of the radar metrology system position and orientation processing portion 190, the mobile radar components MC, and/or the stationary radar components SC. In various implementations, the radar metrology system position and orientation processing portion 190 is configured to determine current received radar signals from the mobile radar components MC or the stationary radar components SC (e.g., as corresponding to a current position and orientation of the mobile radar configuration MRC and/or end tool ETL) in response to receiving the trigger signal. In various implementations, the radar metrology system position and orientation processing portion 190 is configured to process the received radar signals as corresponding to the timing of the trigger signal to determine a position and orientation of the mobile radar configuration MRC and/or end tool ETL at the time of the trigger signal.

As will be described in more detail below, in various implementations, received radar signals may be utilized to determine distances, which may be utilized to calculate/determine a position and orientation (e.g., as based on using nonlinear least squares and/or other processing/calculation techniques). In various implementations, the radar signal from each radar transmitter may be uniquely identified (e.g., based on unique or otherwise identifiable characteristics of the radar signals, such as each radar signal being transmitted at a different frequency, or based on timing, or otherwise with certain unique identifiable portions, and/or in part by utilizing coarse position information determined from the movement system 110 such as in combination with directive antennas of the radar transmitters and/or radar receivers, etc.)

In various implementations, once a position and orientation of the mobile radar configuration MRC is determined, the position and orientation of the end tool may correspondingly be determined (e.g., in accordance with known geometric relationships, relative positioning, offsets etc., between the mobile radar configuration MRC and the end tool ETL). In various implementations, the mobile radar configuration MRC may be directly attached to the end tool ETL, or attached at or very close to the end tool mounting configuration ETMC (e.g., such that there is minimal or no separation between the end tool ETL and the mobile radar configuration MRC). In the implementation of FIG. 1, the mobile radar configuration MRC is illustrated as surrounding the end tool position ETP (e.g., a designated reference position for the end tool ETL, such as may correspond to a center point CENT or other reference point of the end tool ETL and/or mobile radar configuration MRC). Such configurations may reduce the complexity and/or otherwise improve the accuracy of a determination of the position and orientation of the end tool ETL as calculated in relation to a determined position and orientation of the mobile radar configuration MRC.

In various implementations, the determination of the position and orientation of the end tool ETL may further be utilized for determining certain additional position information (e.g., for determining the position of the contact point CP). As noted above, in various implementations, measurements of a workpiece surface (e.g., workpiece surface WPS, WPS', and/or WPS", etc.) may be determined by touching a contact point CP of an end tool ETL to a workpiece surface. In relation to such measurements, both the position and orientation of the end tool ETL may be determined, which may correspondingly indicate the position (e.g., coordinates) of the contact point CP.

In various implementations, different types of end tools ETL may provide different types of outputs that may be utilized with respect to the latch portion 181. For example, in an implementation where the end tool ETL is a touch probe that is used for measuring a workpiece and that outputs a touch signal when it touches the workpiece (e.g., when the contact point CP contacts the workpiece), the latch portion 181 may be configured to input that touch signal or a signal derived therefrom as the at least one input signal that the timing of a trigger signal is determined based on. In various implementations where the end tool ETL is a touch probe, a central axis of the touch probe may correspond to an end tool axis EA. As another example, in an implementation where the end tool ETL is a scanning probe that is used for measuring a workpiece and that provides respective workpiece measurement sample data corresponding to a respective sample timing signal, the latch portion 181 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the latch portion 181 may be configured to input that workpiece image acquisition signal or a signal derived therefrom as the at least one input signal.

In various implementations, the radar metrology system 150 may be configured to determine the position and orientation of the mobile radar configuration and/or end tool ETL, based at least in part on the radar signals (e.g., as transmitted from stationary radar components SC and received by mobile radar components MC, or as transmitted from mobile radar components MC and received by stationary radar components SC). It will be appreciated that such a system may have certain advantages over various alternative systems. For example, in various implementations a system such as that disclosed herein may be smaller and/or less expensive and/or more accurate than certain systems utilizing alternative technologies as may be utilized for tracking positions and orientations. The disclosed system also does not take up or obscure any part of the movement volume MV, such as alternative systems that may include a scale or fiducial on the ground or stage, or otherwise in the same area (e.g., in the movement volume MV) where workpieces may otherwise be worked on and/or inspected, etc.

Figure 3:
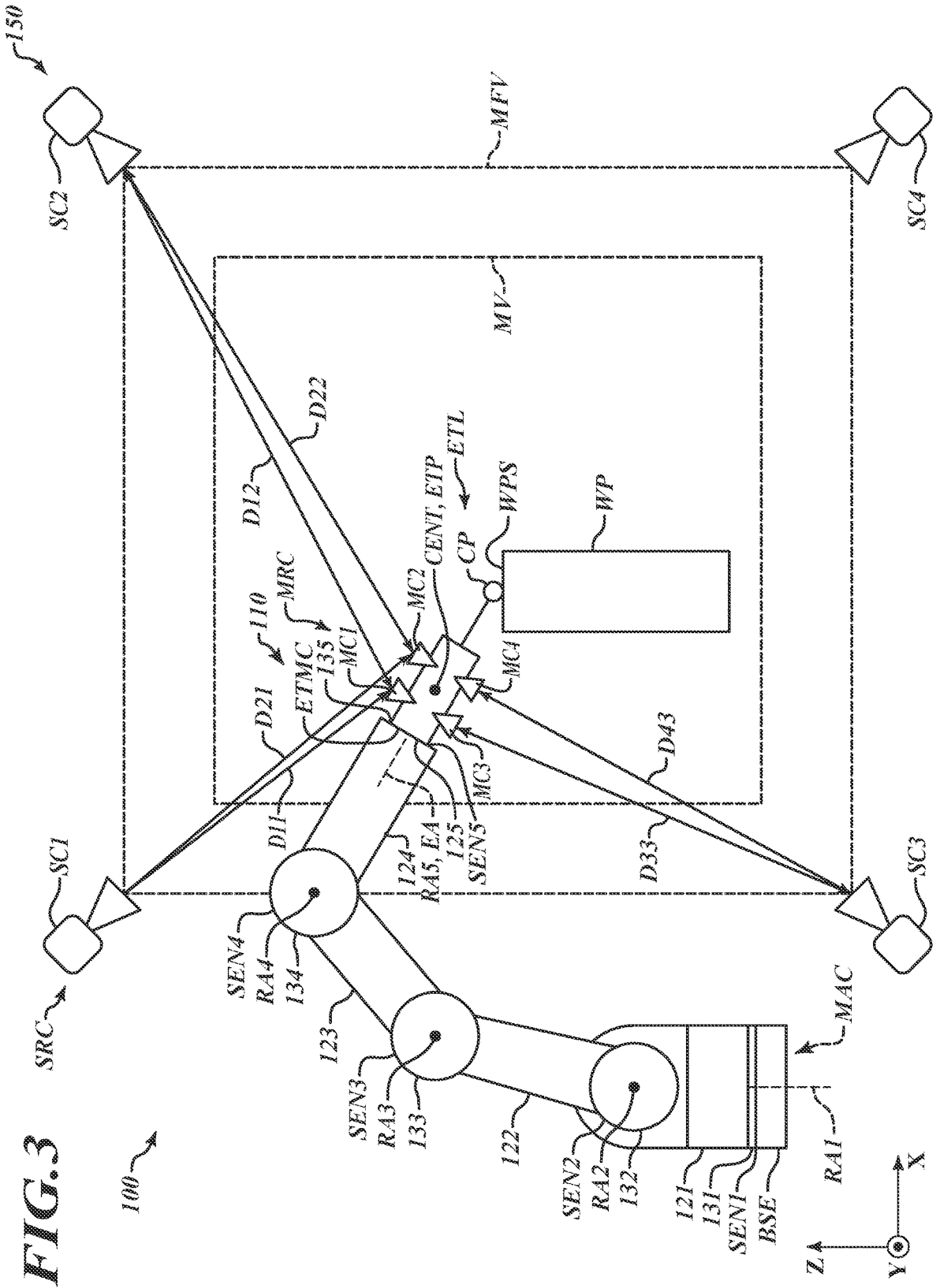
FIG. 3 is a block diagram illustrating a first set of distances between stationary radar components and mobile radar components of the system of FIG. 1.

FIG. 3 is a block diagram illustrating a first set of distances D between stationary radar components SC and mobile radar components MC of the system of FIG. 1. In the example of FIG. 3, the movable mechanical configuration MAC has been controlled to move the end tool ETL to the illustrated position and orientation. In various implementations, the illustrated position of the end tool ETL and mobile radar configuration MRC may be a measurement position (e.g., with the contact point CP of the end tool ETL touching a workpiece surface WPS of the workpiece WP for determining a measurement, or in the examples of FIGS. 4-6 touching a workpiece surface WPS' or WPS" of a workpiece for determining a measurement), for which the position and orientation of the end tool ETL and/or mobile radar configuration MRC may be determined by the radar metrology system 150, as will be described in more detail below. In various implementations, the illustrated positions may alternatively be a calibration position, as will also be described in more detail below (e.g., with respect to FIGS. 16A-19). Similar characterizations (e.g., of potential measurement positions and calibration positions) also apply to the examples of FIGS. 4-6, which will also be described in more detail below.

In FIG. 3, various example distances (e.g., as may be determined by the radar metrology system 150) are illustrated between various mobile radar components MC and stationary radar components SC. More specifically, FIG. 3 illustrates a distance D11 between the radar components MC1 and SC1, a distance D21 between the radar components MC2 and SC1, a distance D12 between the radar components MC1 and SC2, a distance D22 between the radar components MC2 and SC2, a distance D33 between the radar components MC3 and SC3, and a distance D43 between the radar components MC4 and SC3. In various implementations, a processing portion (e.g., position and orientation processing portion 190) is configured to determine the distances D (e.g., the illustrated distances D11, D12, D21, D22, D33 and D43) between stationary radar components SC and mobile radar components MC (e.g., the respective radar components illustrated in FIG. 3) based at least in part on radar signals, wherein the determined distances indicate a position and orientation of the mobile radar configuration MRC and correspondingly the end tool ETL.

In various implementations, each radar transmitter may transmit at a different frequency (e.g., which enables differentiation between the radar signals from the different radar transmitters, for which distances can be determined between the respective pairs of radar transmitters and radar receivers). The ability to identify the radar transmitter based on the frequency of the received radar signal may also enable a coarse distance to be determined (i.e., as corresponding to the distance between the radar transmitter and radar receiver) in accordance with position information from the movement system 110. More specifically, once the radar transmitter is identified, the location of the radar transmitter (e.g., as known or otherwise previously determined, such as by a calibration process) may be compared to the location/position of the radar transmitter as indicated by the coarse position information from the movement system 110, for which a coarse distance (e.g., an approximate distance) between the radar transmitter and radar receiver may be indicated/determined.

As some specific examples of frequencies for the radar signals (i.e., and corresponding wavelengths), in one implementation the radar signals may each have approximately a 10 MHz frequency difference, as corresponding to approximately a 0.833 micron wavelength difference. In accordance with such an implementation, a first radar signal (i.e., from a first radar transmitter) may have a frequency of 60.00 GHz, and a corresponding wavelength $\lambda_1$=5.0000 mm. A second radar signal (i.e., from a second radar transmitter) may have a frequency of 60.01 GHz, and a corresponding wavelength $\lambda_2$=4.9992 mm. A third radar signal (i.e., from a third radar transmitter) may have a frequency of 60.02 GHz, and a corresponding wavelength $\lambda_3$=4.9983 mm. A fourth radar signal (i.e., from a fourth radar transmitter) may have a frequency of 60.03 GHz, and a corresponding wavelength $\lambda_4$=4.9975 mm. In an implementation where the stationary radar components are radar transmitters, the stationary radar components SC1, SC2, SC3 and SC4 may correspond to the first, second, third and fourth radar transmitters in this example, respectively. Some example determinations of specific distances (e.g., distances D11, D21 and D12) in relation to the stationary radar components SC1 and SC2 will be described in more detail below.

In various implementations, distances between radar components may be determined in accordance decomposing a distance D into an integer multiple I and a fractional part F of a wavelength λ, as represented by the following equation:

$$D=(I+F)\cdot\lambda=(I)\cdot\lambda+(F)\cdot\lambda \qquad \text{(Eq. 1)}$$

In various implementations, the phase of the received radar signal (e.g., as corresponding to a fraction of a 360 degree value) may correspond to the value of F. In various implementations, the integer multiple I may be determined in accordance with coarse position information (e.g., as indicated by the movement system 110, such as determined from the position sensors in the movable mechanical configuration MAC).

As some specific numerical examples, in one implementation a metrology frame volume MFV may have dimensions of a meter or more (e.g., 1 m by 1 m, or 2 m by 2 m, etc.), and for a radar signal such as that of the above example with a frequency of 60.00 GHz and a corresponding wavelength $\lambda_1$=5.0 mm (e.g., corresponding to a first radar transmitter, such a stationary radar component SC1), if a corresponding received radar signal (e.g., at a first radar receiver, such as mobile radar component MC1) has a determined phase of 21.6 degrees, in relation to EQUATION 1, such would correspond to F=0.06 (i.e., 21.6 degrees/360 degrees), and a corresponding fractional distance of 0.3 mm (i.e., (0.06)(5.0000 mm)=0.300 mm). If coarse position information (e.g., from the movement system 110 with an accuracy of approximately +/−1 mm) indicates a coarse distance (e.g., between the radar components SC1 and MC1 in the position of FIG. 3) of approximately 461 mm, this may be determined (e.g., by the method/algorithm) to correspond to an integer number of wavelengths I=92 (i.e., for which 92$\lambda_1$=460.000 mm) as combined with the F$\lambda_1$=0.300 mm, for a distance determination according to EQUATION 1 of D=460.300 mm (e.g., as corresponding to the distance D11 between the radar components MC1 and SC1).

As a conceptual example in relation to this result, it will be appreciated that the three nearest possibilities for the highly accurate distance determination based on the received radar signal would be 460.300 mm (i.e., corresponding to 92+0.06 wavelengths), 465.300 mm (i.e., corresponding to 93+0.06 wavelengths), or 455.300 mm (i.e. corresponding to 91+0.06 wavelengths). In relation to EQUATION 1, these three options correspond to I=92, 93 or 91, respectively. In relation to such options, it will be appreciated that a determination may be made with a relatively high level of probability (e.g., utilizing an algorithm or method that selects the wavelength value that has the closest match to the coarse position value provided by the movement system), that the indicated coarse distance of 461 mm likely corresponds with the highly accurate distance determination of 460.300 mm as based on the integer number I=92 wavelengths in combination with the phase of the received radar signal (i.e., the phase of 21.6 degrees which corresponds to the fractional wavelength portion F=0.06), as determined as the corresponding distance by the radar metrology system/ processing portion (e.g., as corresponding to the distance D11 between the radar components MC1 and SC1).

As a similar example based on similar values (e.g., for the same radar transmitter, such as stationary radar component SC1), if a received radar signal (e.g., at a second radar receiver, such as mobile radar component MC2) has a determined phase of 180 degrees, in relation to EQUATION 1, such would correspond to F=0.50 (i.e., 180 degrees/360 degrees), and a corresponding fractional distance of 2.500 mm (i.e., (0.50)(5.0000 mm)=2.500 mm). If coarse position information (e.g., from the movement system 110 with an accuracy of approximately +/−1 mm) indicates a coarse distance of approximately 522 mm (e.g., between the radar components SC1 and MC2 in the position of FIG. 3), this may be determined (e.g., by the method/algorithm) to correspond to an integer number of wavelengths I=104 (i.e., for which 104$\lambda$1=520.000 mm) as combined with the fractional portion F$\lambda$1=2.500 mm, for a distance determination according to EQUATION 1 of 522.500 mm (e.g., as corresponding to the distance D21 between the radar components MC2 and SC1).

As a conceptual example in relation to this result, it will be appreciated that the three nearest possibilities for the highly accurate distance determination based on the radar signal would be 522.500 mm (i.e., corresponding to 104+0.5 wavelengths), 517.500 mm (i.e. corresponding to 103+0.5 wavelengths), or 527.500 mm (i.e., corresponding to 105+ 0.5 wavelengths). In relation to EQUATION 1, these three possibilities correspond to I=104, 103, or 105, respectively. In relation to such options, it will be appreciated that a determination may be made with a relatively high level of probability (e.g., utilizing an algorithm or method that selects the wavelength value that has the closest match to the coarse position value provided by the movement system), that the indicated coarse distance of 522 mm likely corresponds with the highly accurate distance determination of 522.500 mm as based on the integer number I=104 wavelengths in combination with the phase of the received radar signal (i.e., the phase of 180 degrees which corresponds to the fractional wavelength portion F=0.5), as determined as the corresponding distance by the radar metrology system/ processing portion (e.g., as corresponding to the distance D21 between the radar components MC2 and SC1).

As a similar example for a radar transmitter with a different frequency and corresponding wavelength for the transmitted radar signal (e.g., stationary radar component SC2, with a frequency of 60.01 GHz and a corresponding wavelength $\lambda$2 of 4.9992 mm), if a received radar signal (e.g., at a first radar receiver, such as mobile radar component MC1) has a determined phase of 72 degrees, in relation to EQUATION 1, such would correspond to F=0.20 (i.e., 72 degrees/360 degrees), and a corresponding fractional distance of 0.99984 mm (i.e., (0.20)(4.9992 mm)=0.99984 mm). If coarse position information (e.g., from the movement system 110 with an accuracy of approximately +/−1 mm) indicates a coarse distance (e.g., between the radar components SC2 and MC1 in the position of FIG. 3) of approximately 801 mm, this may be determined (e.g., by the method/algorithm) to correspond to an integer number of wavelengths I=160 (i.e., for which 160$\lambda_2$=799.872 mm) as combined with the fractional portion F$\lambda_2$=0.99984 mm, for a distance determination according to EQUATION 1 of 800.8718 mm (e.g., as corresponding to the distance D12 between the radar components MC1 and SC2).

As a conceptual example in relation to this result, it will be appreciated that the three nearest possibilities for the highly accurate distance determination based on the radar signal would be 800.8718 mm (i.e., corresponding to 160+ 0.2 wavelengths), 804.9712 mm (i.e., corresponding to 161+0.2 wavelengths), or 795.8726 mm (i.e. corresponding to 159+0.2 wavelengths). In relation to EQUATION 1, these three possibilities correspond to I=160, 161, or 159, respectively. In relation to such options, it will be appreciated that a determination may be made with a relatively high level of probability (e.g., utilizing an algorithm or method that selects the wavelength value that has the closest match to the coarse position value provided by the movement system), that the indicated coarse distance of 801 mm likely corresponds with the highly accurate distance determination of 800.8718 mm as based on the integer number I=160 wavelengths in combination with the phase of the received radar signal (i.e., the phase of 72 degrees which corresponds to the fractional wavelength portion F=0.2), as determined as the corresponding distance by the radar metrology system/ processing portion (e.g., as corresponding to the distance D12 between the radar components MC1 and SC2).

In various implementations, at least some radar signals of the system may include certain levels of noise or other issues (e.g., as may be indicated by a signal-to-noise ratio, etc.), and for which a fitting routine or method may be utilized to determine a position and orientation (e.g., of the mobile radar configuration and correspondingly the end tool) that has a least amount of discrepancy/difference/errors relative to the determined distances (e.g., for which in some implementations the determined distances may be weighted in accordance with signal strength/amplitude and/or other factors, as well as other processing as described herein). In some implementations, more distances may be determined than are required for determining/solving for the position and orientation, but for which such additionally determined distances may in some instances further improve the accuracy of the determined position and orientation (e.g., such as in relation to effects of random noise in the radar signals and/or determined distances which may be at least partially averaged out by the additional determined distances).

In various implementations, each of the mobile radar components MC of a mobile radar configuration MRC may have certain known and/or determined characteristics (e.g., relative locations and orientations within the mobile radar configuration, etc.) which spatially relate each mobile radar component to the mobile radar configuration. Such characteristics enable a position and orientation of the mobile radar configuration to be determined, based at least in part on the determined distances between the mobile radar components and the stationary radar components of the stationary radar configuration. As one aspect, it is noted that the mobile radar components may have certain spatial dimensions/offsets in relation to one another (e.g., in the example of FIG. 1, the mobile radar components MC1 and MC2 are illustrated as being located relative to one another within the mobile radar configuration MRC and as separated by dimension SD12). It will be appreciated that such spatial dimensions/offsets may be included and/or otherwise accounted for in position calculations/determinations (e.g., including the processing/ calculations as performed by the radar metrology system position and orientation processing portion 190 for processing the received radar signals to determine the position and orientation of the mobile radar configuration MRC and/or end tool ETL, etc.). Once a position and orientation of the mobile radar configuration MRC is determined, any known and/or determined geometric relationships and/or relative positioning/offsets between the mobile radar configuration MRC and the end tool ETL may also be utilized for determining the position and orientation of the end tool ETL.

It will be appreciated that in various implementations, only some of the receiving/transmitting pairs (i.e., corresponding to only some of the mobile radar components MC and stationary radar components SC) will have transmitted/ received radar signals that are sufficient for making valid determinations of distances (e.g., for providing valid distance data). Such may depend on a number of factors (e.g., reception angles as related to directional antennas which may have reception cones or otherwise be directionally dependent for receiving radar signals, radar signal strength, the respective arrangements of the radar components within the mobile radar configuration MRC and the stationary radar configuration SRC, the orientation of the end tool ETL, etc.) FIG. 3 may be characterized as illustrating an example where only some of the pairs of radar components have such transmitted/received radar signals suitable for determining distances.

For example, as illustrated in FIG. 3, the mobile radar components MC1 and MC2 (e.g., including the horn antennas) are not oriented toward (e.g., within the conical horn antenna angles) the stationary radar components SC3 or SC4, and so there are no radar signals/distances indicated as being determined between those components. Similarly, the mobile radar components MC3 and MC4 (e.g., including the horn antennas) are not orientated toward (e.g., within the conical horn antenna angles) the stationary radar components SC1, SC2 or SC4, and so there are no radar/signals distances indicated as being determined between those components. Conversely, the mobile radar components MC1 and MC2 (e.g., including the horn antennas) are oriented toward (e.g., within the conical horn antenna angles) the stationary radar components SC1 and SC2, and so there are radar signals/distances D11, D12, D21 and D22 indicated as being determined between those respective components. Similarly, the mobile radar components MC3 and MC4 (e.g., including the horn antennas) are oriented toward (e.g., within the conical horn antenna angles) the stationary radar component SC3, and so there are radar signals/distances D33 and D43 indicated as being determined between those respective components.

Figure 4:
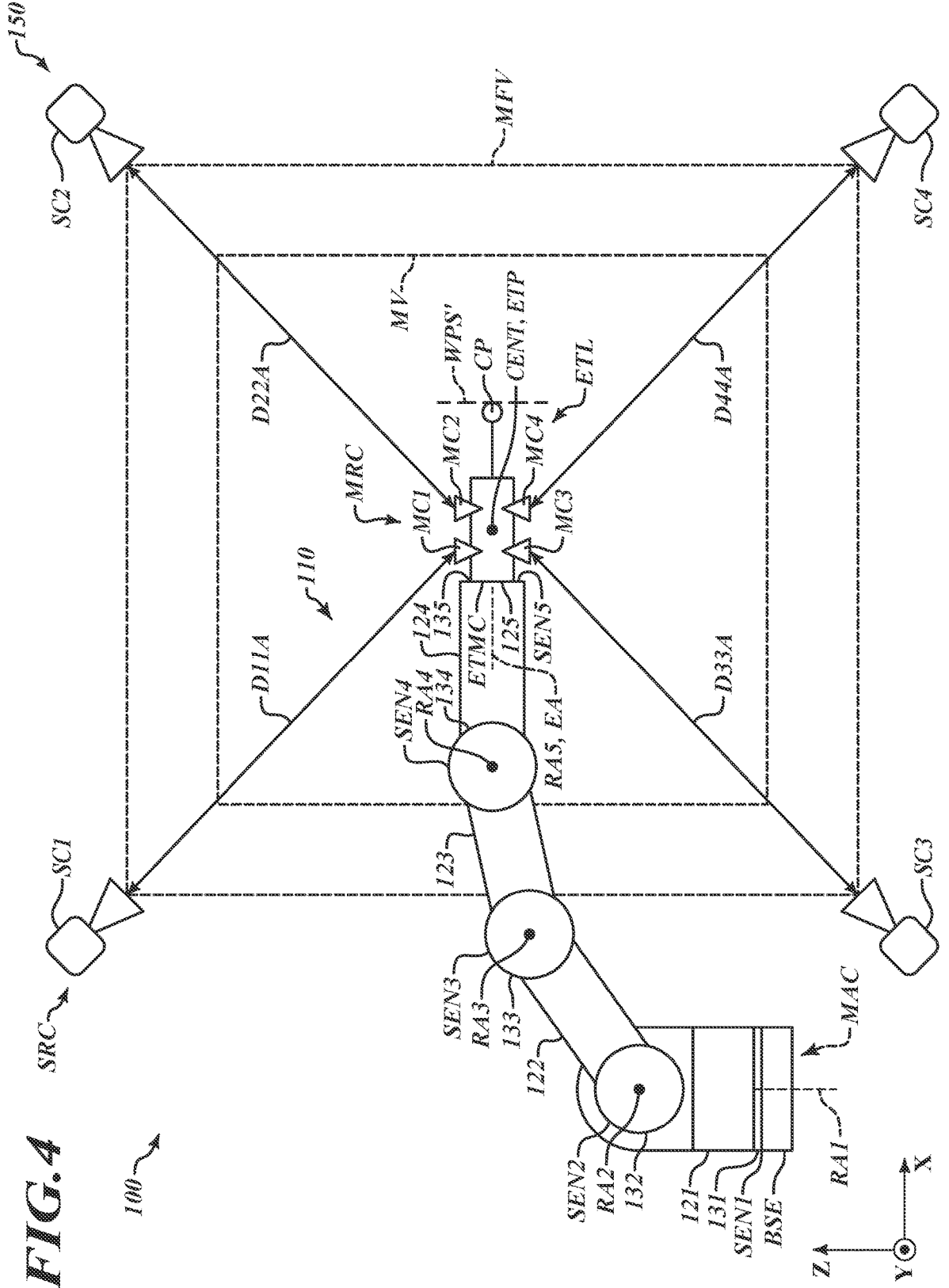
FIG. 4 is a block diagram illustrating a second set of distances between stationary radar components and mobile radar components of the system of FIG. 1.

FIG. 4 is a block diagram illustrating a second set of distances between stationary radar components and mobile radar components of the system of FIG. 1. More specifically, FIG. 4 illustrates a distance D11A between the radar components MC1 and SC1, a distance D22A between the radar components MC2 and SC2, a distance D33A between the radar components MC3 and SC3, and a distance D44A between the radar components MC4 and SC4. As described above, the determined distances D can be utilized to determine the position and orientation (i.e., the pose) of the mobile radar configuration MRC and correspondingly the end tool ETL. In accordance with the simplified example of FIG. 4, the determined distances happen to all be equal (i.e., such that D11A=D22A=D33A=D44A), wherein a center point CENT of the mobile radar configuration MRC and/or end tool ETL is in a center of the movement volume MV and/or a center of the metrology frame volume MFV. It is noted that this corresponds to a second position and orientation of the mobile radar configuration MRC and/or end tool ETL, relative to the first position and orientation as illustrated in FIG. 3.

As some specific numerical examples, for a radar signal such as that of the above example with a frequency of 60.00 GHz and a corresponding wavelength $\lambda_1$ of 5.0000 mm (e.g., corresponding to a first radar transmitter, such a stationary radar component SC1), if a corresponding received radar signal (e.g., at a first radar receiver, such as mobile radar component MC1) has a determined phase of 50.4 degrees, in relation to EQUATION 1, such would correspond to F=0.14 (i.e., 50.4 degrees/360 degrees), and a corresponding fractional distance of 0.700 mm (i.e., (0.14)(5.0 mm)=0.700 mm). If coarse position information (e.g., from the movement system 110 with an accuracy of approximately +/−1 mm) indicates a coarse distance (e.g., between the radar components MC1 and SC1 in the position of FIG. 4) of approximately 641 mm, this may be determined (e.g., by the method/algorithm) to correspond to an integer number of wavelengths I=128 (i.e., for which $128\lambda_1$=640.000 mm) as combined with the fractional portion $F\lambda_1$=0.700 mm, for a distance determination according to EQUATION 1 of 640.700 mm (e.g., as corresponding to the distance D11 between the radar components MC1 and SC1).

As a similar example for a radar transmitter with a different frequency and corresponding wavelength for the transmitted radar signal (e.g., stationary radar component SC2, with a frequency of 60.01 GHz and a corresponding wavelength $\lambda 2$ of 4.9992 mm), if a received radar signal (e.g., at a second radar receiver, such as mobile radar component MC2) has a determined phase of 57.78 degrees, in relation to EQUATION 1, such would correspond to F=0.1605 (i.e., 57.78 degrees/360 degrees), and a corresponding fractional distance of 0.80237 mm (i.e., (0.1605) (4.9992 mm)=0.80237 mm). If coarse position information (e.g., from the movement system 110 with an accuracy of approximately +/−1 mm) indicates a coarse distance (e.g., between the radar components MC2 and SC2 in the position of FIG. 4) of approximately 641 mm, this may be determined (e.g., by the method/algorithm) to correspond to an integer number of wavelengths I=128 (i.e., for which $128\lambda_2$=639.8976 mm) as combined with the fractional portion $F\lambda_2$=0.80237 mm, for a distance determination according to EQUATION 1 of 640.700 mm (e.g., as corresponding to the distance D22 between the radar components MC2 and SC2).

The above example values are also noted to correspond to the above described condition of D11=D22 (i.e., each with a value of 640.700 mm in accordance with the example values). These values are thus also noted to illustrate an example where an equivalent distance D may be determined in accordance with different radar signals with different frequencies (i.e., which may each have a different determined phase and/or integer number of wavelengths of the received radar signal for a same distance, in accordance with the different corresponding frequencies).

Figure 5:
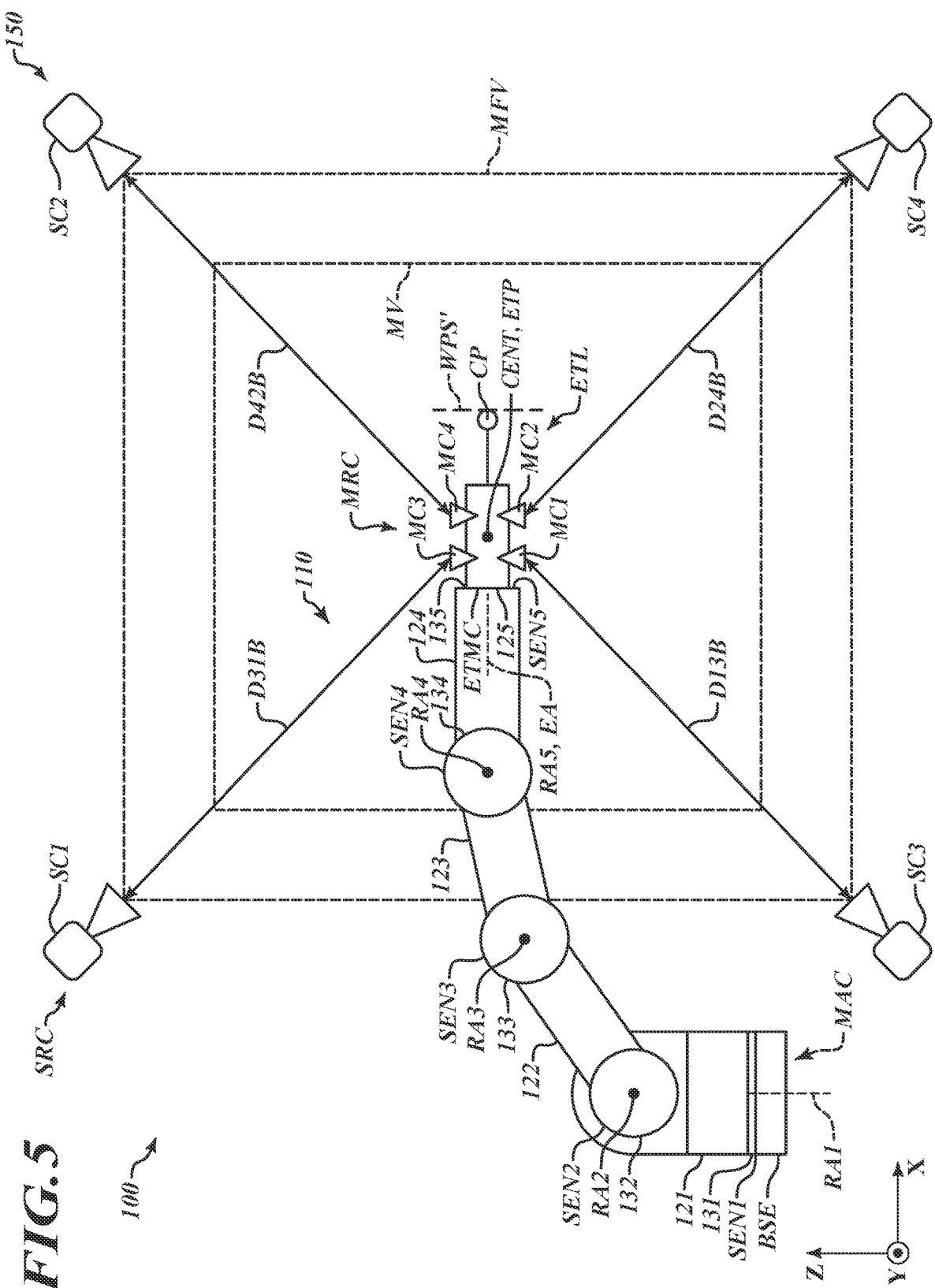
FIG. 5 is a block diagram illustrating a third set of distances between stationary radar components and mobile radar components of the system of FIG. 1.

FIG. 5 is a block diagram illustrating a third set of distances between stationary radar components and mobile radar components of the system of FIG. 1. More specifically, FIG. 5 illustrates a distance D31B between the radar components MC3 and SC1, a distance D42B between the radar components MC4 and SC2, a distance D13B between the radar components MC1 and SC3, and a distance D24B between the radar components MC2 and SC4. Relative to the example of FIG. 4, in the example of FIG. 5, the mobile radar configuration MRC and end tool ETL have been rotated around a horizontal axis (e.g., have been rotated by 180 degrees) such that the relative positions of the mobile radar components MC1 and MC2 have been switched with the relative positions of the mobile radar components MC3 and MC4. In this example third orientation, a center point CENT of the mobile radar configuration MRC and/or end tool ETL remains in a center of the movement volume MV and/or a center of the metrology frame volume MFV, and the indicated distances are again all equal, in this case such that D13B=D24B=D31B=D42B.

It will be appreciated that while the center point CENT is in the same position in the examples of FIGS. 4 and 5 (e.g., as may correspond to a same determined position of the mobile radar configuration MRC and/or end tool ETL), a different orientation of the mobile radar configuration MRC and/or end tool ETL can be determined based on the determined distances indicated in FIG. 5 relative to those indicated in FIG. 4. More specifically, the distances D13B, D24B, D31B and D42B of FIG. 5 indicate the different positions of the mobile radar components MC1, MC2, MC3 and MC4, in comparison to the positions indicated by the distances D11A, D22A, D33A and D44A of FIG. 4, on the basis of which the different corresponding orientations of the mobile radar configuration MRC and/or end tool ETL can be determined.

Figure 6:
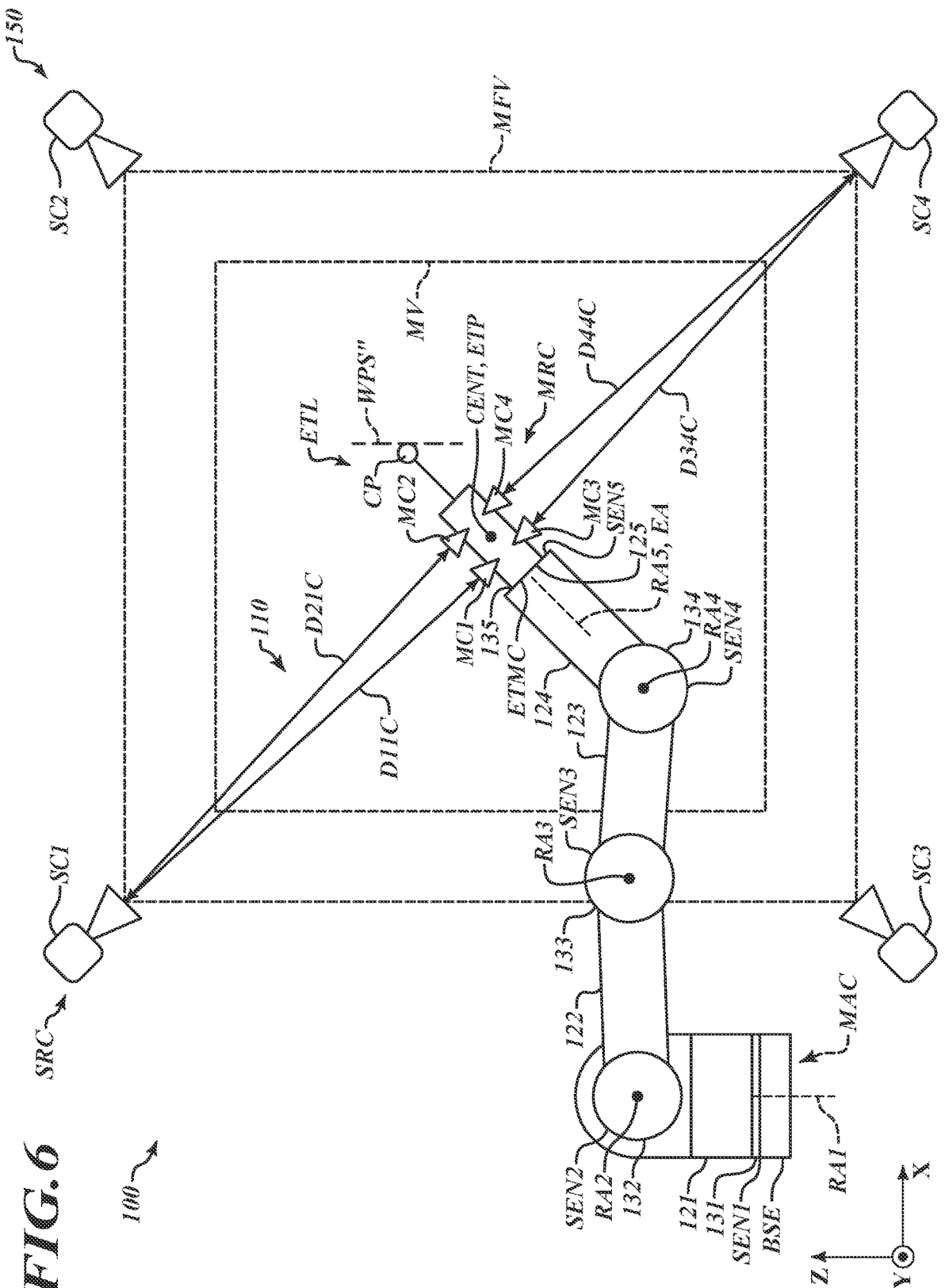
FIG. 6 is a block diagram illustrating a fourth set of distances between stationary radar components and mobile radar components of the system of FIG. 1.

FIG. 6 is a block diagram illustrating a fourth set of distances between stationary radar components and mobile radar components of the system of FIG. 1. More specifically, FIG. 6 illustrates a distance D11C between the radar components MC1 and SC1, a distance D21C between the radar components MC2 and SC1, a distance D34C between the radar components MC3 and SC4, and a distance D44C between the radar components MC4 and SC4. In this example fourth orientation, a center point CENT of the mobile radar configuration MRC and/or end tool ETL remains in a center of the movement volume MV and/or a center of the metrology frame volume MFV, and the indicated distances are again all equal, in this case such that D11C=D21C=D34C=D44C.

It will be appreciated that while center point CENT is in the same position in the examples of FIGS. 4, 5 and 6 (e.g., as may correspond to a same determined position of the mobile radar configuration MRC and/or end tool ETL), a different orientation of the mobile radar configuration MRC and/or end tool ETL can be determined based on the determined distances indicated in FIG. 6 relative to those indicated in FIGS. 4 and 5. More specifically, the distances D11C, D21C, D34C and D44C of FIG. 6 indicate the different positions of the mobile radar components MC1, MC2, MC3 and MC4, in comparison to the positions indicated by the distances of FIGS. 4 and 5, on the basis of which the different corresponding orientations of the mobile radar configuration MRC and/or end tool ETL can be determined.

Figure 7:
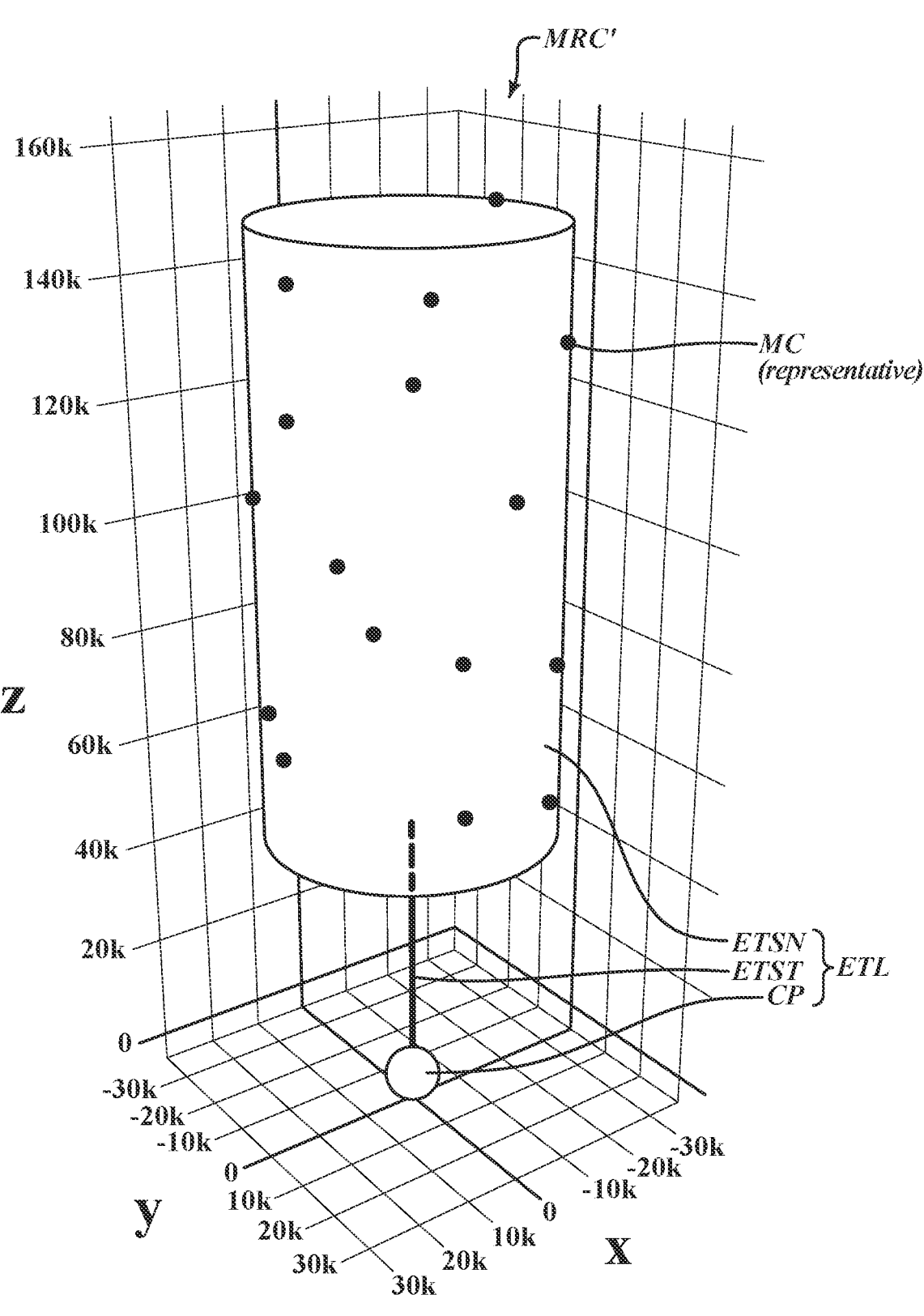
FIG. 7 is a diagram of a mobile radar configuration including mobile radar components as coupled to an end tool.

FIG. 7 is a diagram of a mobile radar configuration MRC' including mobile radar components MC as coupled to an end tool ETL, and FIGS. 8A and 8B are diagrams of stationary radar configurations SRC' and SCR", respectively, including stationary radar components SC that define at least part of a metrology frame volume. In various implementations, it may be desirable for a radar metrology system to include a sufficient number of stationary and mobile radar components (e.g., radar transmitters and receivers) so as to reduce or eliminate reception "blind spots" and/or meet other system requirements. Such configurations may provide a desired amount of redundancy (e.g., to accommodate for issues such as "line of sight loss" due to a workpiece, robot arm or other objects in the environment blocking or otherwise inhibiting the transmission of radar signals between particular pairs of radar transmitters and radar receivers when the end tool is in particular positions/orientations, etc.)

In relation to such principles, in the example of FIG. 7, the mobile radar configuration MRC' is illustrated as including mobile radar components MC (i.e., represented as black dots) in a Fibonacci arrangement as coupled to a cylindrical surface of an end tool ETL (e.g., which in one specific example implementation may have an end tool sensing portion ETSN enclosed in a body portion having the cylindrical surface with a diameter of approximately 50 mm and a length of approximately 100 mm). In one specific example implementation, twenty-one mobile radar components MC may be included in the mobile radar configuration MRC'.

In the example of FIG. 8A, the stationary radar configuration SRC' is illustrated as including stationary radar components SC (i.e., represented as black dots) that at least partially define a metrology frame volume MFV' that has a cubical shape (e.g., including eight or more stationary radar components SC, such as including one located at each corner of the cubical volume). In the example of FIG. 8B, the stationary radar configuration SRC" is illustrated as including stationary radar components SC (i.e., represented as black dots) that at least partially define a metrology frame volume MFV" that has an approximately spherical shape. In various specific example implementations, the stationary radar configuration SRC" may include nine, or eleven, or other numbers of stationary radar components SC. As one specific example implementation for a radar metrology system, a mobile radar configuration may include twenty-one mobile radar components MC (e.g., in a configuration similar to that illustrated in FIG. 7), and a stationary radar configuration may include nine stationary radar components (e.g., in a configuration similar to that illustrated in FIG. 8A or 8B).

In relation to minimum numbers of components for utilization in a radar metrology system, in certain implementations it may be desirable for a stationary radar configuration to include at least three stationary radar components SC (e.g., radar transmitters) for enabling position determinations (e.g., in terms of 3-dimensional coordinates) in three-dimensional space. In certain implementations, in relation to a desired balance for reducing or eliminating "blind spots", it may be desirable for a stationary radar configuration to include at least eight stationary radar components SC. In certain implementations, it may be desirable for a mobile radar configuration to include at least four mobile radar components (e.g., radar receivers), to enable determination of an orientation (e.g., of the mobile radar configuration and correspondingly of the attached/coupled end tool in three-dimensional space). In various implementations, it may be desirable for a mobile radar configuration to include a number N of mobile radar components (e.g., radar receivers) equal to at least $2/(1-\cos\theta)$ mobile radar components (e.g., to approximately achieve full solid angle coverage), with $2\theta$ being the reception cone angle (e.g., of the conical horn antenna, such as a 60 degree reception cone angle) defined by acceptable signal-to-noise (SNR) degradation (e.g., −3 dB).

Figure 9:
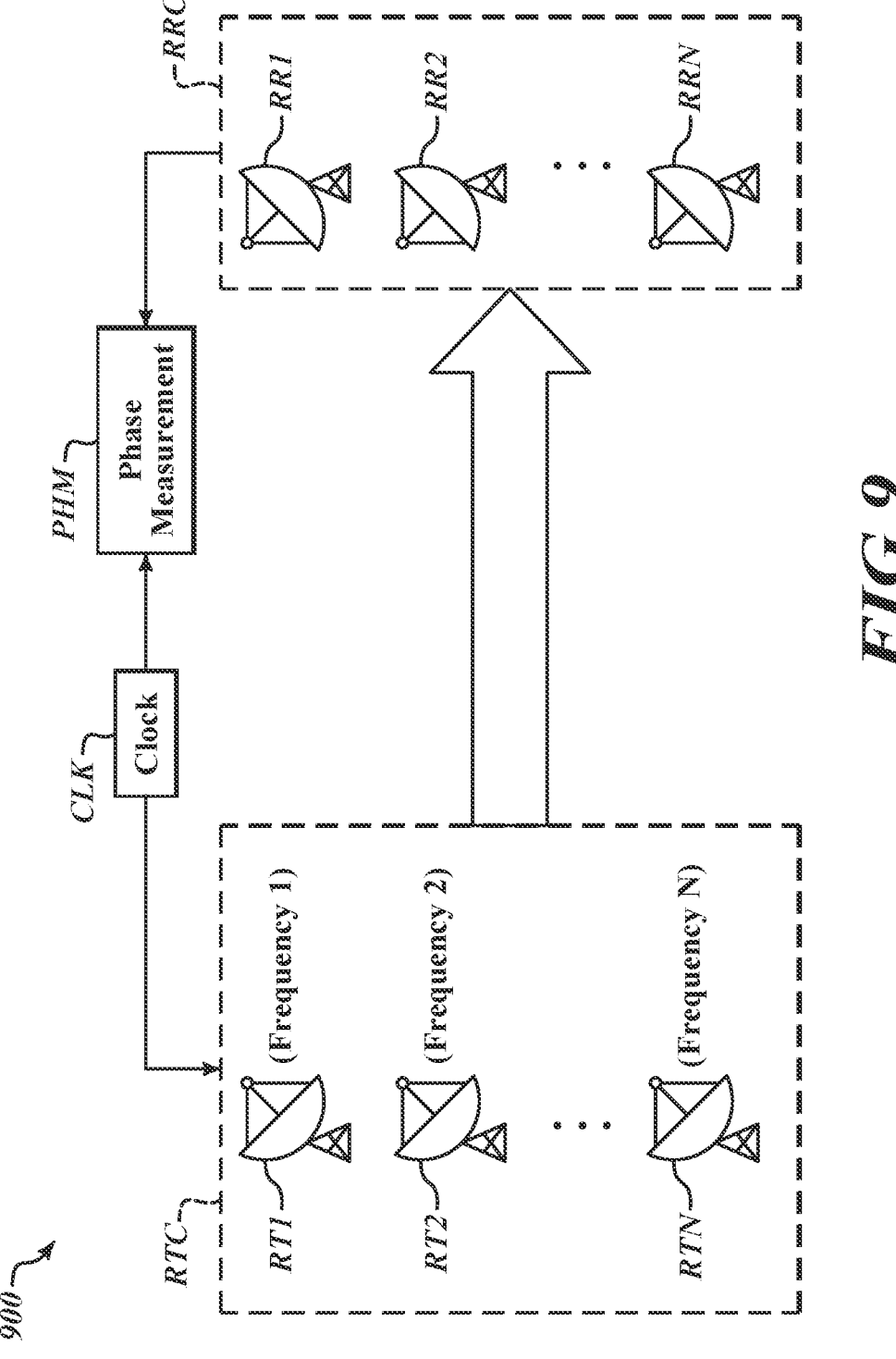
FIG. 9 is a diagram illustrating a first representation of processing of a radar metrology system.

FIG. 9 is a diagram illustrating processing of a radar metrology system 900 (e.g., as may be representative of the processing of the radar metrology system 100 and/or other implementations as described herein). The illustrated processing is generally for a bistatic radar system without reflections (e.g., in accordance with the implementations as disclosed herein). The radar signals are sent directly from radar transmitters RT1-RTN of a radar transmitter configuration RTC (e.g., for which each radar transmitter RT may transmit a radar signal at a different frequency) to radar receivers RR1-RRN of a radar receiver configuration RRC. It will be appreciated that such configurations may significantly reduce multipath reflections. As noted above, in various implementations the radar transmitter configuration RTC and the radar receiver configuration RRC may be a stationary radar configuration SRC and a mobile radar configuration MRC, respectively, or vice versa.

A clock portion CLK provides a clock signal to the radar transmitter configuration RTC (e.g., as utilized for generating the radar signals from the radar transmitters RT1-RTN at the different frequencies), and to a phase measurement portion PHM (e.g., as utilized for the processing and phase determination of the radar signals as received by the radar receivers RR1-RRN of a radar receiver configuration RRC). As described herein, for a radar receiver and radar transmitter pair (i.e., with a radar signal transmitted and received between them), the radar transmitter can be uniquely identified via frequency of the transmitted and received radar signal. More specifically, when a radar signal is received by a radar receiver RR, the radar transmitter RT that transmitted the radar signal can be uniquely identified in accordance with the unique frequency of the radar signal (e.g., for which each radar transmitter may transmit a radar signal at a different frequency). The phase measurement portion PHM determines a phase of the received radar signal, which is utilized to determine a distance between the respective radar receiver and radar transmitter with high accuracy and precision.

Figure 10:
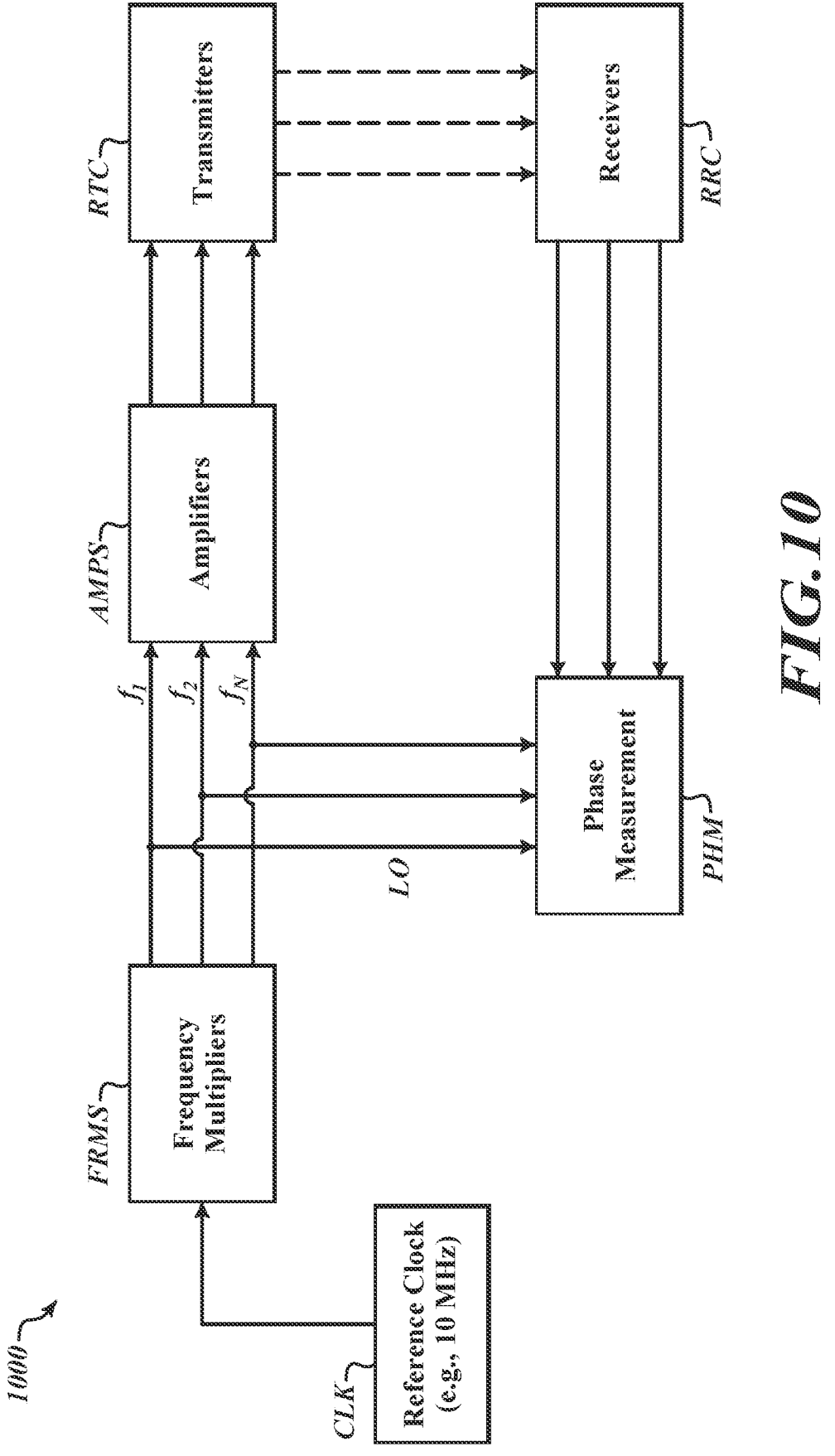
FIG. 10 is a diagram illustrating a second representation of processing of a radar metrology system.

FIG. 10 is a diagram illustrating processing of a radar metrology system 1000 (e.g., as may be representative of the processing of the radar metrology system 100 and/or other implementations as described herein). As indicated in FIG. 10, a reference clock (e.g., a 10 MHz clock) provides a signal (e.g., a reference clock signal) to a frequency multipliers portion FRMS, which provides signals at different frequencies (e.g., frequencies $f_1$ to $f_N$) to an amplifiers portion AMPS, which amplifies each of the signals and provides them to a radar transmitter configuration RTC (e.g., which may be a stationary radar configuration or a mobile radar configuration, as described herein). Based on the amplified signals, the radar transmitters (e.g., stationary radar components or mobile radar components) of the radar transmitter configuration RTC transmit corresponding radar signals (e.g., with each transmitted radar signal having the corresponding different frequency).

At least some of the transmitted radar signals are received by radar receivers of a radar receiver configuration RRC (e.g., which may be a mobile radar configuration or a stationary radar configuration, as described herein). In various implementations, each radar receiver (e.g., a mobile radar component or stationary radar component) may receive or may not receive a radar signal from a given radar transmitter (e.g., depending on orientations, signal strength, etc., as described herein). Thus, each radar receiver may receive multiple, one, or no radar signals from the radar transmitter configuration RTC. Radar signals that are received are provided to a phase measurement portion PHM, which also receives inputs from the frequency multipliers portion FRMS (e.g., for which the input signals may be processed or provided by a local oscillator). Part of a phase measurement portion PHM (e.g., for receiving the signals from one of the radar receivers of the radar receiver configuration RRC) will be described in more detail below with respect to FIG. 11.

Figure 11:
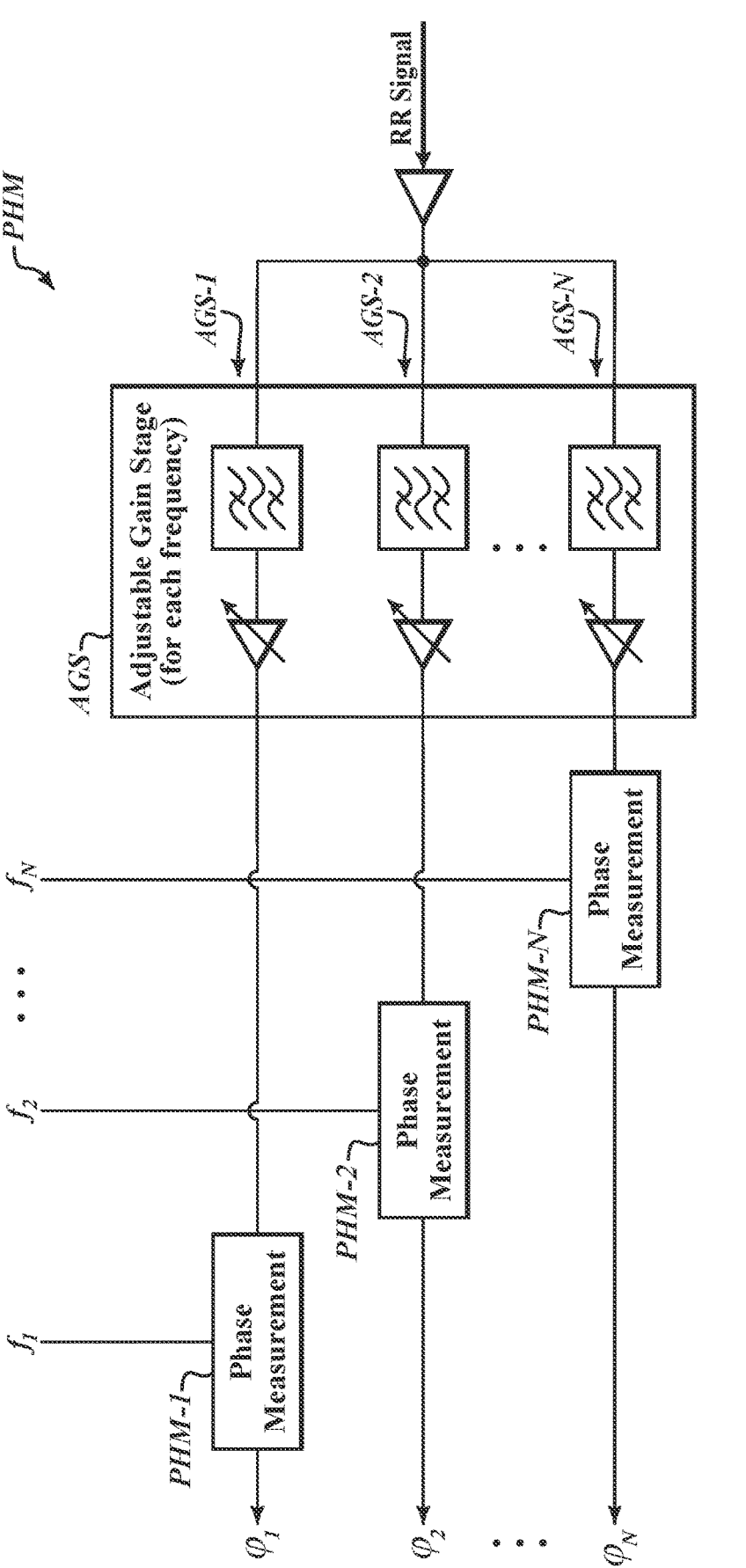
FIG. 11 is a diagram illustrating a representation of phase measurement of a radar metrology system.

FIG. 11 is a diagram illustrating at least part of a phase measurement portion PHM of a radar metrology system (e.g., such as that of FIG. 10). The illustrated representation is for a single radar receiver RR as receiving radar signals from a plurality of radar transmitters (e.g., with each received radar signal having a different frequency). In a radar metrology system, it will be appreciated that a total number of potential phase measurements may correspond to the total number of radar transmitters multiplied by the total number of radar receivers (e.g., in a system with 9 radar transmitters and 21 radar receivers, there may be a total number of 189 potential phase measurements, although likely a fewer number of radar signals will be received and require phase measurement in actual operation due to different orientations, signal strengths, etc., as described herein).

In the example of FIG. 11, it is indicated that there may be a total of N radar transmitters (e.g., for which again only some of the transmitted radar signals may be received by the radar receiver RR and processed). The radar signal(s) as received by the radar receiver RR are shown to be processed through parallel adjustable gain stages AGS-1 to AGS-N of an adjustable gain stage portion AGS (i.e., with adjustable gain for each frequency, for which each frequency corresponds to a unique radar transmitter). The signals from the adjustable gain stages AGS-1 to AGS-N each pass to a respective phase measurement portion PHM-1 to PHM-N, which each also receive a respective frequency signal f₁ to f_N. The output of each phase measurement portion PHM-1 to PHM-N is a respective signal indicating the respective determined phase $\varphi_1$ to $\varphi_N$. As described herein (e.g., with respect to EQUATION 1, and the examples of FIG. 3, etc.), in various implementations the determined phase may be utilized as part of the process for determining a distance between a respective pair of a stationary radar component and a mobile radar component (e.g., as corresponding to a respective pair of a radar transmitter and receiver, between which the radar signal passes as transmitted and received).

FIG. 12 is a diagram illustrating an implementation of a radar metrology system 1200 utilizing multiplexing. In the example of FIG. 12, the radar metrology system 1200 includes a radar transmitter configuration (i.e., a stationary radar configuration) including radar transmitters RT1-RT4 (i.e., stationary radar components). Also included is a radar receiver configuration (i.e., a mobile radar configuration) including radar receivers RR1 and RR2 (i.e., mobile radar components) which are coupled to an end tool ETL (e.g., a probe) and are oriented in opposing directions.

In various implementations, small chip scale antennas or other components that may be utilized in some configurations may be relatively inexpensive but may have a relatively limited (e.g., ~60 degree) reception cone (e.g., with a −3 dB cutoff). In the position and orientation illustrated in FIG. 12, such factors may result in the radar receiver RR1 primarily receiving radar signals from the radar transmitters RT1 and RT2, while the radar receiver RR2 may primarily receive radar signals from the radar transmitters RT3 and RT4. In relation to such issues, in certain implementations it may be desirable to combine the received radar signals from multiple radar receivers to make better use of available signal processing channels. As illustrated in the example of FIG. 12, the outputs from the radar receivers RR1 and RR2 are jointly provided to a signal processing portion SPR (i.e., the received radar signals are combined/multiplexed), and are further provided to a phase measurement portion PHM (i.e., which determines the phases of the received radar signals). In various implementations, this processing may introduce certain ambiguities (e.g., in relation to determining which radar receiver a respective radar signal was received at), although such ambiguities may be resolved at least in part through utilization of the movement system's indication of the position and orientation end tool ETL (e.g., as determined from the position sensors SEN1-SEN5 in the movable mechanical configuration MAC).

Figure 13:
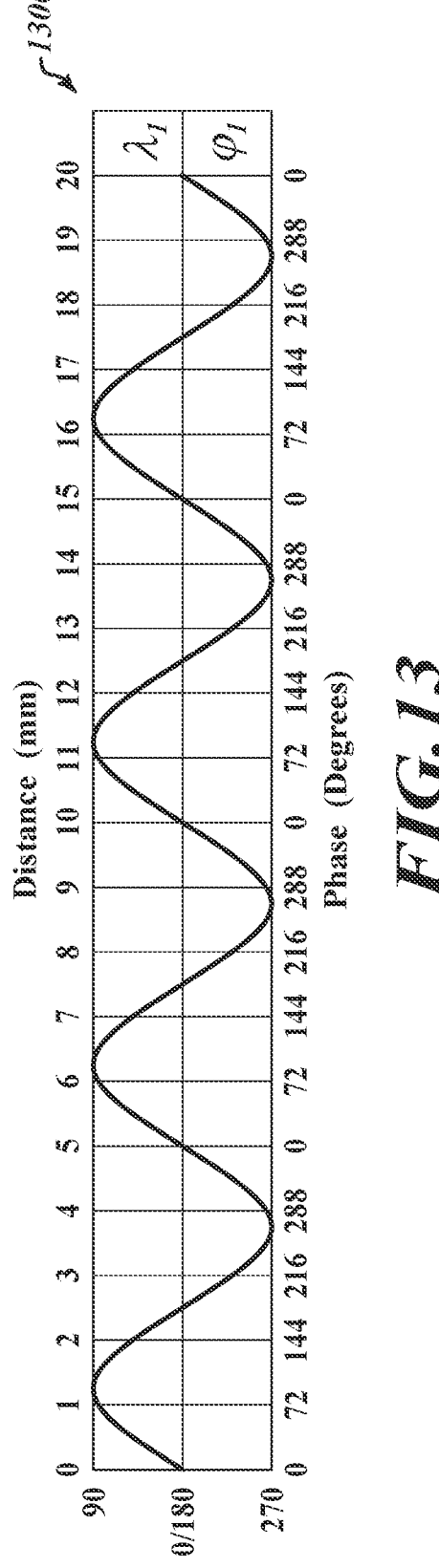
FIG. 13 is a diagram illustrating a radar signal.

FIG. 13 is a diagram illustrating a graph of a radar signal 1300. In the example of FIG. 13, the radar signal 1300 is transmitted at a RF frequency of 60 GHz, and corresponds to 5 mm wavelength (i.e., the wavelength $\lambda 1$=5.0 mm). In the illustrated graph, a cycle of phase values is indicated on the Y-axis, and for which values are plotted relative to a distance scale that is included along an X-axis at the top of graph (and for which phase values as corresponding to each indicated distance of each 1 mm step are also indicated on a bottom X-axis of the graph). The graph illustrates the phase $\varphi 1$ values as corresponding to the first radar signal with the first frequency (i.e., 60 GHz) and wavelength $\lambda 1$ (i.e., where $\lambda 1$=5.0 mm), and for which the values are shown to cycle through 4 wavelengths/cycles/periods (i.e., with each wavelength corresponding to a distance of 5.0 mm).

As illustrated by FIG. 13, the total distance values depend not only on each phase value, but also which wavelength/cycle/period each phase value falls within. As an example, for the distance D=12 mm in FIG. 13, the phase $\varphi_1$=144 degrees and falls within the 3rd wavelength/cycle/period of the corresponding waveform. In relation to EQUATION 1, this would correspond to values of I=2 (i.e., corresponding to an integer number of 2 full wavelengths) and F=(144/360)=0.4, for which the total distance D=(I)·λ+(F)·λ=10 mm+2 mm=12 mm.

In various implementations, a phase unwrapping process (e.g., utilizing position information, such as from the position sensors of the movement system, and/or from any other system or technique that may indicate an approximate position or distance, etc.) indicates a coarse distance from which an integer number of wavelengths/cycles/periods of the received radar signal can be determined (e.g., for which in the above example each cycle/period corresponds to a distance of 5.0 mm, in accordance with the wavelength $\lambda 1$=5.0 mm). The distance corresponding to the integer number of wavelengths/cycles/periods may be combined with (e.g., added to) a fractional distance (e.g., as corresponding to the phase of the received radar signal, which indicates an additional fraction of a wavelength of the received radar signal, such as wavelength $\lambda 1$=5.0 mm) to determine the overall distance with a high degree of accuracy.

In various implementations, rather than transmitting radar signals at different frequencies, other characteristics may be utilized for distinguishing the radar signals received from different radar transmitters. For example, some or all of the radar transmitters of a radar transmitter configuration may transmit radar signals at a same frequency and with a same corresponding wavelength (e.g., such as corresponding to the radar signal 1300 of FIG. 13), but with other distinguishing characteristics (e.g., such as possible timing differences, etc.) In some implementations, the radar transmitters may transmit the radar signals at different times and/or otherwise with time-based differences such that a received radar signal can be uniquely identified as having been sent from a particular radar transmitter.

In some implementations, such radar signals may be received and processed according to different timings (e.g., sequentially, etc.) In some instances, such sequential or otherwise time based methods may help reduce certain amounts of crosstalk and/or other issues that may otherwise occur in relation to simultaneously transmitted radar signals, and may also enable the system to operate in a relatively narrow frequency range (e.g., utilizing a single transmission frequency) and/or may reduce certain complexities of the system (e.g., related to not requiring different frequencies for the radar signals). In some implementations, a relatively longer overall processing time may result from such techniques (e.g., in comparison to a system where all radar signals are transmitted simultaneously), although for which such processing time may still be sufficient (e.g., depending on the desired measurement rates and/or speed of movements of the system and/or of an end tool that is being tracked, etc.)

FIG. 14 is a flow diagram illustrating an exemplary implementation of a routine 1400 for operating a radar metrology system. At a block 1410, a radar metrology system is provided comprising: a mobile radar configuration comprising a plurality of mobile radar components that are configured to be coupled to at least one of an end tool or an end tool mounting configuration of a movement system that moves the end tool; and a stationary radar configuration comprising a plurality of stationary radar components that define at least part of a metrology frame volume that surrounds at least part of a movement volume in which at least a portion of the end tool is moved. At a block 1420, distances are determined between stationary radar components and mobile radar components based at least in part on radar signals, wherein the determined distances indicate a position and orientation (e.g., of the mobile radar configuration and/or end tool), and the radar signals are either: transmitted from the stationary radar components and received by the mobile radar components, for which the stationary radar components are radar transmitters and the mobile radar components are radar receivers; or transmitted from the mobile radar components and received by the stationary radar components, for which the mobile radar components are radar transmitters and the stationary radar components are radar receivers. At a block 1430, a position and orientation (e.g., of the mobile radar configuration and/or end tool) are determined based at least in part on the determined distances between stationary radar components and mobile radar components.

FIGS. 15A and 15B are flow diagrams illustrating routines (e.g., sub-routines) for implementing certain portions of the routine of FIG. 14. FIG. 15A illustrates a routine 1420' (e.g., for implementing at least part of block 1420 of FIG. 14 for determining distances). At a block 1510, phase unwrapping is performed (e.g., using coarse position information such as provided by position sensors of the movable mechanical configuration MAC). As part of the phase unwrapping, the coarse position information may be used to determine, for each received radar signal, a number (e.g., an integer number) of complete wavelengths of the radar signal, such as may occur for the radar signal over the distance between the respective radar transmitter and the respective radar receiver. At a block 1520, distances are determined (e.g., for each received radar signal, and as based at least in part on the coarse position/phase unwrapping and the determined phase for the received radar signal). As described above, the coarse position information may correspond to/indicate a number of complete wavelengths of the received radar signal, and for which the determined phase may correspond to an additional fractional portion of a wavelength of the received radar signal, for which the sum of the whole wavelengths and fractional portion of the wavelength indicates the total distance between the corresponding pair of radar components (e.g., as indicated by EQUATION 1 and the above described examples).

FIG. 15B illustrates a routine 1430' (e.g., for implementing at least part of block 1430 of FIG. 14 for determining position and orientation, and as may represent further processing from the routine 1420' of FIG. 15A). At a block 1530, for each received radar signal, a signal-to-noise ratio (SNR) is estimated based on the amplitude of the signal. At a block 1540, based at least in part on the determined SNRs, weights are calculated for each respective distance determined from each radar signal (e.g., including SNR thresholding, etc.) At a block 1550, based at least in part on the determined distances (e.g., from block 1520) and the calculated weights for the determined distances (e.g., from block 1540), a fitting routine is performed (e.g., for fitting the determined weighted distances to the known or otherwise previously determined relationships between the radar components, including in some implementations utilizing a calibration determination of stationary radar component locations, a calibration determination of relative mobile radar component arrangement, and/or previously/recently determined position and orientation, etc.) At a block 1560, based at least in part on the result of the fitting routine, a position and orientation are determined (e.g., of the mobile radar configuration and/or the end tool, etc.)

In various implementations, the determined position and orientation of block 1560 may also be provided as an input to the fitting routing of block 1550 for assisting with a future determination of a next position and orientation. For example, after a first position and orientation are determined, for a second position and orientation (e.g., to be determined shortly after the first position and orientation, such as part of a high speed tracking process) the fitting routine at block 1550 may be performed based at least in part on determined distances (e.g., from block 1520) corresponding to the second position and orientation, and also based at least in part on the previously determined first position and orientation (e.g., which may effectively be utilized as a type of "warm start" for the fitting routine). It will be appreciated that in some implementations such processing may effectively increase the speed at which such determinations may be made. As a simplified example, in some instances with small incremental movements between first and second positions and orientations, the first position and orientation may effectively be utilized as a starting point for the analysis (e.g., for the fitting routine, and for which in some cases some or all of the integer multiples I in EQUATION 1 may be the same and some small distance changes may primarily correspond only to phase differences within a given wavelength, etc.)

The following describes various exemplary embodiments of the present disclosure with various features and elements annotated with reference characters (i.e., reference numerals and reference letters) found in figures described herein. It should be understood that the reference characters are added to indicate exemplary embodiments, and the features and elements are not limited to the particular embodiments illustrated in the figures.

As described above, in various implementations the radar metrology system 150 includes a mobile radar configuration MRC and a stationary radar configuration SRC. The mobile radar configuration MRC includes a plurality of mobile radar components MC that are configured to be coupled to at least one of the end tool ETL or the end tool mounting configuration ETMC. The stationary radar configuration SRC includes a plurality of stationary radar components SC that define at least part of a metrology frame volume MFV that surrounds at least part of the movement volume MV in which at least a portion of the end tool ETL is moved. Distances D are determined (e.g., by the radar metrology system 150, or more specifically by a processing portion of the system, such as the position and orientation processing portion 190) between stationary radar components SC and mobile radar components MC (e.g., wherein each distance is between a respective pair, including a respective stationary radar component SC and a respective mobile radar component MC), based at least in part on radar signals (e.g., including a radar signal transmitted and received between each respective pair), wherein the determined distances indicate a position and orientation (e.g., of the mobile radar configuration MRC and/or end tool ETL). In various implementations, a position and orientation (e.g., of the mobile radar configuration MRC and/or end tool ETL) are determined (e.g., by the radar metrology system 150, or more specifically by a processing portion of the system) based at least in part on the determined distances between stationary radar components SC and mobile radar components MC.

In various implementations, the determining of the distances includes determining at least a first distance D11 and a second distance D22. The first distance D11 is between a first stationary radar component SC1 and a first mobile radar component MC1, wherein the first distance D11 is determined based at least in part on a first radar signal which is transmitted by the first radar transmitter (e.g., stationary radar component SC1) at a first frequency and received by the first radar receiver (e.g., mobile radar component MC1). The second distance D22 is between a second stationary radar component SC2 and a second mobile radar component MC2, wherein the second distance D22 is determined based at least in part on a second radar signal which is transmitted by the second radar transmitter (e.g., the second stationary radar component SC2) at a second frequency (i.e., which is different than the first frequency) and received by the second radar receiver (e.g., the second mobile radar component MC2). In various implementations, a third distance D21 may be determined based at least in part on the first radar signal which is transmitted by the first radar transmitter (e.g., stationary radar component SC1) at the first frequency and received by the second radar receiver (e.g., the second mobile radar component MC2). It will be appreciated that in an implementation where the radar signals are transmitted at different frequencies (e.g., with each radar transmitter transmitting at a unique frequency), the received radar signals can each be associated with, or otherwise determined as corresponding to, the associated radar transmitter (e.g., for which the distance between the respective radar receiver and radar transmitter can correspondingly be determined based on the received radar signal). In various implementations, a position and orientation (e.g., of the mobile radar configuration MRC and/or end tool ETL) may be determined (e.g., by the processing portion) based at least in part on the first determined distance D11 between the first stationary radar component SC1 and the first mobile radar component MC1 and the second determined distance D22 between the second stationary radar component SC2 and the second mobile radar component MC2.

In various implementations, when the mobile radar configuration MRC and correspondingly the end tool ETL is in a first position (e.g., a first measurement position) and a first orientation (e.g., as illustrated in FIG. 3), the radar signals that are received correspond to a first set of distances (e.g., distances D11, D12, D21, D22, D33 and D43) between the mobile radar components MC (e.g., mobile radar components MC1, MC2, MC3 and MC4) and stationary radar components SC (e.g., stationary radar components SC1, SC2 and SC3) and which indicate that the mobile radar configuration MRC and correspondingly the end tool ETL are in the first position and the first orientation. When the mobile radar configuration MRC is in a second position (e.g., a second measurement position) and a second orientation that are different than the first position and the first orientation (e.g., as illustrated in FIG. 4), the radar signals that are received correspond to a second set of distances (e.g., distances D11A, D22A, D33A and D44A) between the mobile radar components MC (e.g., mobile radar components MC1, MC2, MC3 and MC4) and stationary radar components SC (e.g., stationary radar components SC1, SC2, SC3 and SC4) and which indicate that the mobile radar configuration MRC and correspondingly the end tool ETL are in the second position and the second orientation.

In various implementations, a determination may be made (e.g., by the processing portion) that a first mobile radar component MC1 is at a first distance D11 from a first stationary radar component SC1 when the end tool ETL is in a first position and in a first orientation (e.g., as illustrated in FIG. 3). The determination of the first distance D11 may be based at least in part on processing a radar signal that is either transmitted from the first stationary radar component SC1 and received by the first mobile radar component MC1, or transmitted from the first mobile radar component MC1 and received by the first stationary radar component SC1, while the end tool ETL is in the first position and first orientation (e.g., as illustrated in FIG. 3). A determination may further be made that the first mobile radar component MC1 is at a second distance D11A from the first stationary radar component SC1 that is different from the first distance D11 when the end tool ETL is in a second position and in a second orientation (e.g., as illustrated in FIG. 4). The determination of the second distance D11A may be based at least in part on processing a radar signal that is either transmitted from the first stationary radar component SC1 and received by the first mobile radar component MC1, or transmitted from the first mobile radar component MC1 and received by the first stationary radar component SC1, while the end tool ETL is in the second position and second orientation (e.g., as illustrated in FIG. 4).

In various implementations, the determining of the distances D is based at least in part on determining a phase of each received radar signal. In various implementations, the determining of the distances D is further based at least in part on determining a number of wavelengths (e.g., an integer number of wavelengths) of each received radar signal as occurring between the corresponding radar transmitter and the corresponding radar receiver. In various implementations, the motion control system 140 is configured to sense a position of the end tool ETL based at least in part on using a plurality of position sensors (e.g., sensors SEN1-SEN5) included in the movable mechanical configuration MAC, and the determining of the number of wavelengths (e.g., the integer number of wavelengths) of each received radar signal is based at least in part on the position as sensed by the motion control system 140.

In various implementations, either the plurality of stationary radar components SC, or the plurality of mobile radar components MC, may be controlled (e.g., by a processing portion) to generate the transmitted radar signals, wherein the transmitted radar signals each have a different frequency, and the transmitted radar signals comprise a first radar signal with a first frequency, and a second radar signal with a second frequency that is different than the first frequency.

In various implementations, the mobile radar configuration MRC may be a radar receiver configuration and the mobile radar components MC may be radar receivers, and the stationary radar configuration SRC may be a radar transmitter configuration and the stationary radar components SC may be radar transmitters.

In various implementations, a processing portion (e.g., as part of a control system, such as processing portion 180 and/or 190 of FIG. 2) is configured to perform a calibration process (e.g., for a radar metrology system, such as that described herein). In general, the precision and accuracy of the position determinations (e.g., the position tracking) of the radar metrology system 150 may depend at least in part on accurate knowledge of the locations of certain radar components of the system (e.g., the stationary radar components SC, etc.) For example, in one specific example implementation, it has been determined that a 3 micron calibration uncertainty (e.g., in regard to the locations of the stationary radar components, etc.) may correspond to approximately 3.5 to 4 micron tracking precision (e.g., of an end tool ETL, such as a touch probe), in the radar metrology system 150.

In various implementations, a process (e.g., as part of a calibration and/or measurement process) may be performed which determines the locations of both the stationary radar components SC and the mobile radar components MC. However, for certain implementations, such a process may be slower than desired (e.g., such as in a system with a desired measurement rate on the order of 10 kHz). In order to improve the speed for measurements, a calibration process (e.g., as part of a calibration mode) may be performed first, in order to determine the locations of the stationary radar components SC (e.g., radar transmitters) with a high degree of accuracy. Thereafter, for subsequent performances of a measurement process (e.g., as part of a measurement mode, which may also be referenced as a high-speed position tracking mode), the previously determined locations of the stationary radar components SC (i.e., from the calibration process) are utilized and only the locations of the mobile radar components MC (e.g., radar receivers) are determined. It will be appreciated that such a configuration may enable the measurement process to be performed more quickly (e.g., due to fewer unknowns, such as unknown locations, etc. that need to be solved for).

In various implementations, the calibration process may be performed on a recurring basis (e.g., at regular intervals, such as daily, or in accordance with determined changes in conditions and/or measurement accuracy, etc.) It will be appreciated that the calibration process may help address certain issues for radar metrology systems. For example, in some instances it may otherwise be challenging to maintain a desired level of accuracy/precision (e.g., micron-level precision) in relation to the locations of the stationary radar components SC (e.g., which may be mounted on fixtures spanning relatively large distances, such as a meter or more), when environmental changes and/or mechanical drift, etc. may occur. It will be appreciated that the regular performance of a calibration process may help address such issues for maintaining a desired level of accuracy, and as disclosed herein may be performed without requiring any additional hardware or additional systems (e.g., in addition to the metrology system 150).

As will be described in more detail below, the calibration process includes determining distances between mobile radar components MC and stationary radar components SC, at different calibration positions that the mobile radar configuration MRC is moved to (e.g., by the movement system 110). The determined distances at the different calibration positions are utilized to determine the locations (e.g., coordinates) of the stationary radar components SC. In various implementations, the time required for performing the calibration process may be affected by different factors (e.g., increasing or decreasing the number of calibration positions may make the process longer or shorter, etc.) In various implementations, such longer times for performing the calibration process may generally result in higher accuracy but may also have at least some level of diminishing returns. As will be described in more detail below, FIGS. 16A-16C illustrate implementations with different numbers of calibrations positions (e.g., which may correspond to different amounts of time required for performing the respective calibration processes).

Figure 16A:
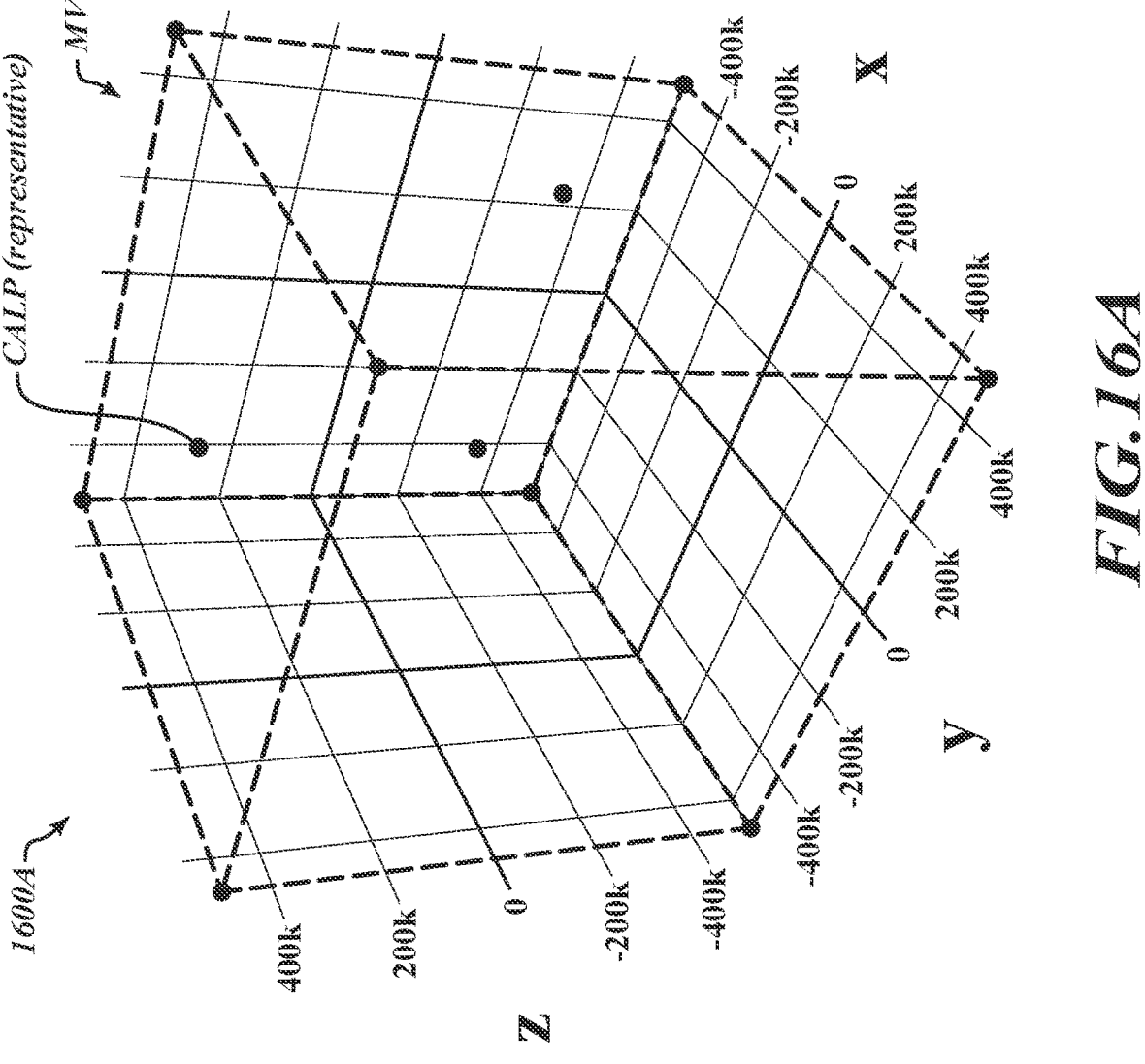
FIGS. 16A-16C are diagrams illustrating sets of calibration positions within a movement volume.
Figure 16B:
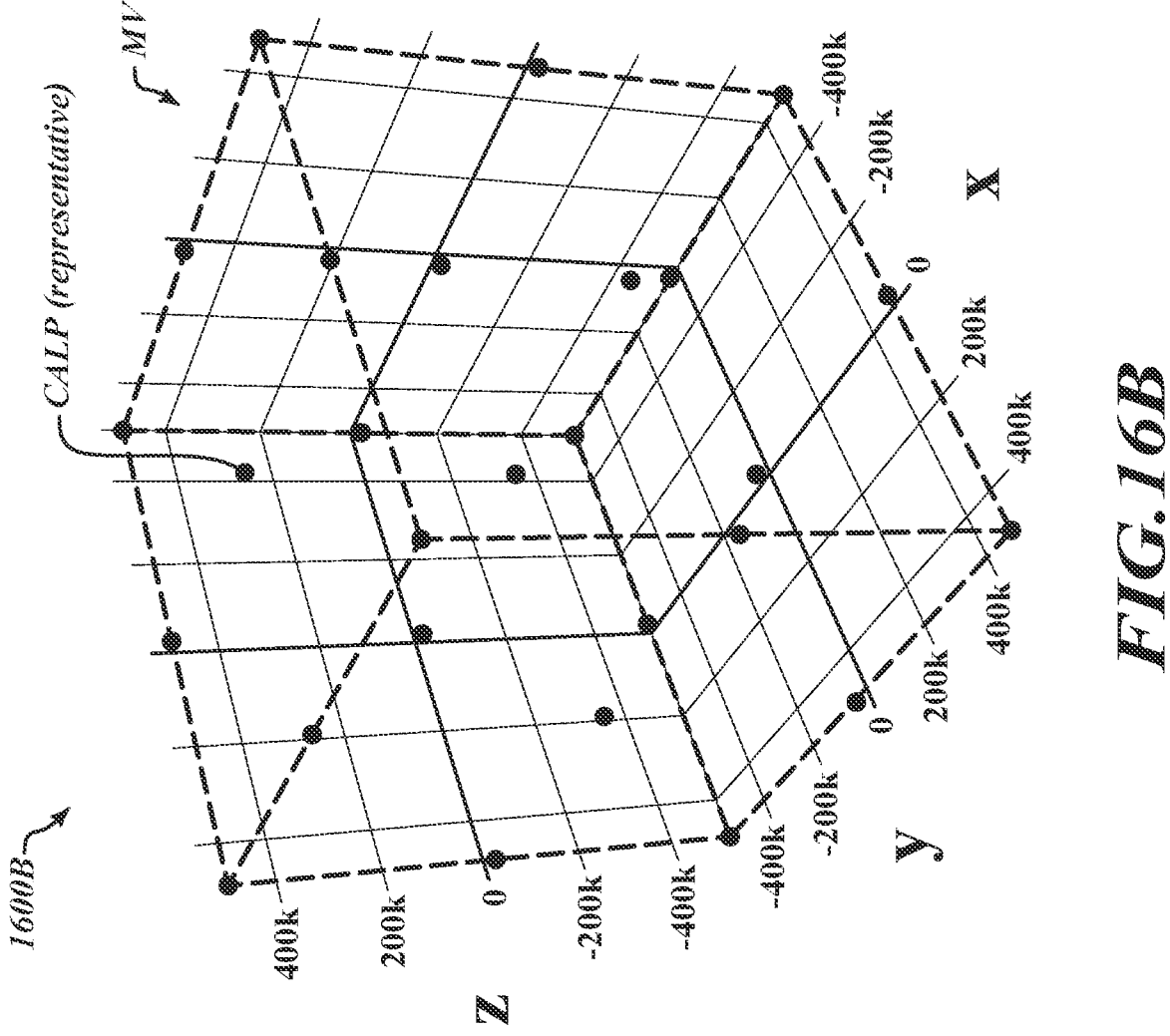
Figure 16C:
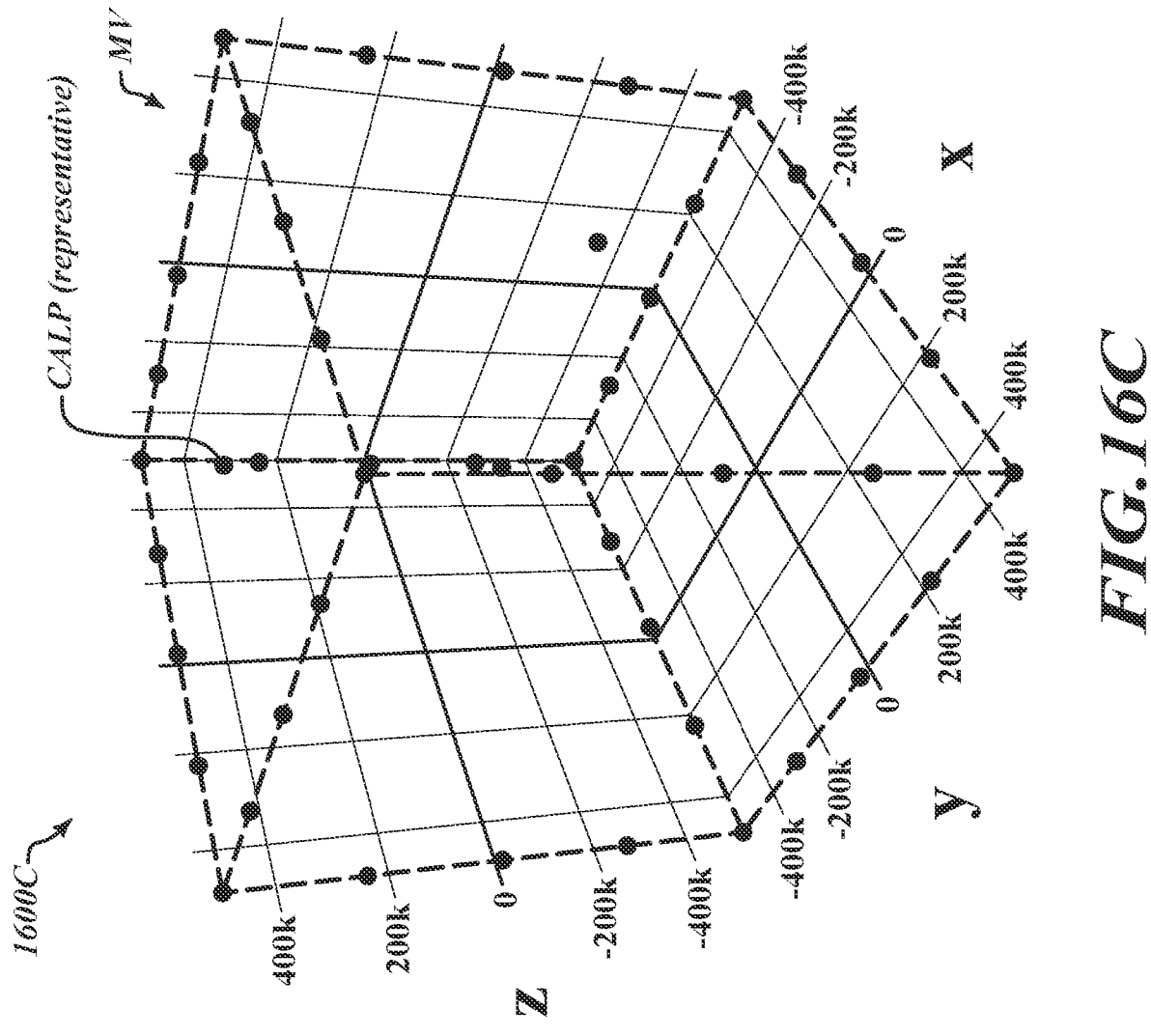

FIGS. 16A-16C are diagrams illustrating sets 1600A-1600C of calibration positions CALP (i.e., represented as black dots), which in the illustrated examples each define a cubical volume within a movement volume MV of a radar metrology system (e.g., radar metrology system 150). During a respective calibration process, a mobile radar configuration MRC is moved to each of the calibration positions CALP (e.g., a center point CENT, or a specific mobile radar component MC, or other reference point of the mobile radar configuration MRC may be moved to and/or centered at each of the respective calibration positions CALP). In certain implementations, for some or all of the calibration positions CALP, the orientation of the mobile radar configuration MRC may be the same (e.g., as maintained or otherwise controlled by the movement system 110). Such implementations may simplify certain calculations or other processes for determining the locations of the stationary radar components SC (e.g., by reducing the number of unknowns that need to be solved for, such as variables or other factors as related to the orientation of the mobile radar configuration MRC at each calibration position, etc.)

In the example of FIG. 16A, the set of calibration positions 1600A includes 11 calibration positions CALP (i.e., including, in relation to the illustrated cubical volume, 8 in the corners, 1 in a center of the top face, 1 in a center of a side face, and 1 in the geometric center). In the example of FIG. 16B, the set of calibration positions 1600B includes 27 calibration positions CALP (i.e., including, in relation to the illustrated cubical volume, 8 in the corners, 12 in the centers of the edges, 6 in the centers of the faces, and 1 in the geometric center). In the example of FIG. 16C, the set of calibration positions 1600C includes 47 calibration positions CALP (i.e., including, in relation to the illustrated cubical volume, 8 in the corners, 12 in the centers of the edges, 24 evenly spaced along the edges and between the calibration positions in the centers of the edges and the corners, 1 in a center of the top face, 1 in a center of a side face, and 1 in the geometric center).

In various implementations, the different numbers of calibration positions in the examples of FIGS. 16A-16C may correspond to different amounts of time required for performing the respective calibration process and different resulting calibration precision/accuracy. For example, in one simulation, assumptions are made for a 0.3 micron precision for the individual distance measurements, and a configuration is utilized with approximately 9 stationary radar components SC (e.g., with a configuration similar to that of FIGS. 8A and/or 8B) and with approximately 21 mobile radar components MC (e.g., with a configuration similar to that of FIG. 7). In accordance with such a simulation, the amount of time required to perform the calibration process with the 11 calibration positions illustrated in FIG. 16A may take approximately 2 minutes, and may result in a calibration precision of approximately 3.3 microns. The amount of time required to perform the calibration process with the 27 calibration positions illustrated in FIG. 16B may take approximately 10 minutes, and may result in a calibration precision of approximately 3.0 microns. The amount of time required to perform the calibration process with the 47 calibration positions illustrated in FIG. 16C may take approximately 30 minutes, and may result in a calibration precision of approximately 2.6 microns. While such times and accuracies may be different for different systems, it will be appreciated that in general, a number of calibration positions for performing a calibration process may be selected in accordance with a desired amount of time and accuracy for the calibration process. In one example implementation (e.g., with the 9 stationary radar components SC and 21 mobile radar components MC), the 27 calibration positions illustrated in FIG. 16B may be preferable, as representing a desirable combination of time and accuracy for performing the calibration process.

In various implementations, as part of the calibration process, different types of algorithms/solving methods may be utilized for determining the locations of the stationary radar components SC based at least in part on the determined distances between the stationary radar components SC and the mobile radar components MC at the different calibration positions. For example as part of a numerical optimization method, the Broyden-Fletcher-Goldfarb-Shanno (BFGS)

algorithm may be utilized which is an iterative method for solving unconstrained nonlinear optimization problems, as described at https://en.wikipedia.org/wiki/Broyden-Fletcher-Goldfarb-Shanno_algorithm. As another example, the covariance matrix adaptation evolution strategy (CMA-ES) may be utilized, which is a strategy for numerical optimization, as described at https://en.wikipedia.org/wiki/CMA-ES. It will be appreciated that in other implementations, other algorithms/solving methods may also or alternatively be utilized.

Figure 17:
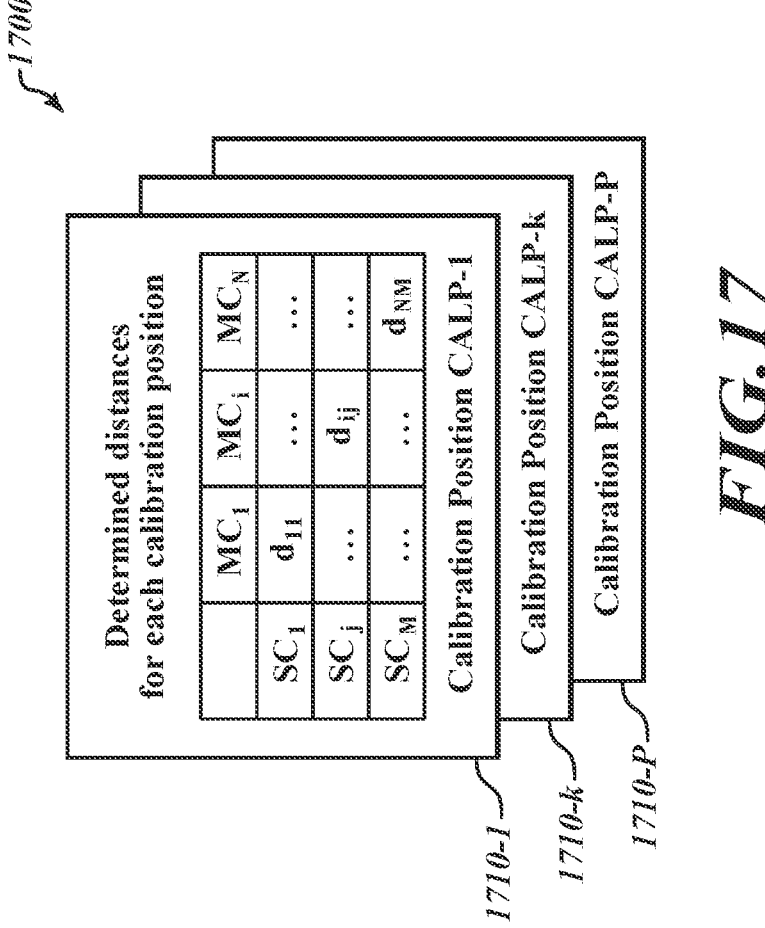
FIG. 17 is a diagram illustrating processing for a set of calibration positions.

FIG. 17 is a diagram illustrating sets 1700 of determined distances for calibration positions. As noted above, as part of the calibration process, for each calibration position CALP, distances between respective stationary radar components SC and mobile radar components MC are determined (i.e., as based at least on the received radar signals as each corresponding to a respective pair of a stationary radar component and a mobile radar component). The illustrated sets 1700 are intended to indicate that at least some distances may be determined for each calibration position CALP-1 to CALP-P (e.g., for which in the specific examples of FIGS. 16A, 16B and 16C, the number of calibration positions may be 11, 27 or 47, for which calibration position CALP-P may be CALP-11, CALP-27 or CALP-47, respectively). In the illustrated example, there is a total number N of mobile radar components, for which the corresponding mobile radar configuration MRC includes mobile radar components $MC_1$ to $MC_N$ (e.g., for which N=21 in the example of FIG. 7). There is also a total number M of stationary radar components, for which the corresponding stationary radar configuration SRC includes stationary radar components $SC_1$ to $SC_M$ (e.g., for which M=8 or 9 in the examples of FIG. 8A or 8B, respectively).

As some example values, for a first calibration position CALP-1, a corresponding set 1710-1 of determined distances includes a matrix of determined distances. Some example distances from the matrix as shown in the illustration include distances $d_{11}$, $d_{ij}$ and $d_{NM}$. It will be appreciated that other distances may also or alternatively be determined, but are not all included in the generalized representation and for purposes of simplifying the illustration. The determined distance $d_{11}$ corresponds to a distance between a mobile radar component $MC_1$ and a stationary radar component $SC_1$. The determined distance $d_{ij}$ corresponds to a distance between a mobile radar component $MC_1$ and a stationary radar component SQ. The determined distance $d_{NM}$ corresponds to a distance between the mobile radar component $MC_N$ and the stationary radar component $SC_M$. As noted above, other distances may also or alternatively be determined (e.g., including between any receiving/transmitting pairs of the mobile radar components $MC_1$ to $MC_N$ and the stationary radar components $SC_1$ to $SC_M$, for which there is a received radar signal from which a distance determination can be made).

As noted above, only some of the receiving/transmitting pairs (i.e., corresponding to only some of the mobile radar components MC and stationary radar components SC) will have transmitted/received radar signals that are sufficient for making valid determinations of distances (e.g., for providing valid distance data), as may depend on a number of factors (e.g., reception angles, radar signal strength, the respective arrangements of the radar components within the mobile radar configuration MRC and the stationary radar configuration SRC, the orientation of the end tool ETL, etc.) As noted above, FIG. 3 may be characterized as illustrating an example where only some of the pairs of radar components have such transmitted/received radar signals suitable for determining distances. FIG. 17 further illustrates for calibration positions CALP-k and CALP-P, corresponding sets 1710-k and 1710-P of determined distances, although again it will be understood that these are intended as merely examples and for which in various implementations additional sets of determined distances 1710-1 to 1710-P may be determined for some or all of the calibration positions CALP-1 to CALP-P (e.g., including for 11, 27 or 47 calibration positions in the examples of FIGS. 16A, 16B and 16C).

As noted above, the calibration process includes utilizing the determined distances (e.g., from each calibration position) for determining locations (e.g., coordinates) of the stationary radar components. In various implementations, one type of algorithm that may be utilized for such processing may be referenced as a simultaneous localization and calibration (SLAC) algorithm (e.g., which may be an iterative solver and/or which may utilize any of the techniques and/or algorithms as described above). In various implementations, the inputs for the algorithm may include: the measured distances between the mobile radar components MC and the stationary radar components SC for each calibration position; the relative positions/locations/orientations of the mobile radar components MC within the mobile radar configuration MRC; and an estimated topology of the locations of the stationary radar components SC (e.g., as may be known, or measured, such as by a user with a hand tool or methods for determining the approximate relative positions of each of the stationary radar components within the stationary radar configuration, or determined from a previously performed calibration process, etc.) In certain implementations, when estimated locations of the stationary radar components SC are known from a previously performed calibration process (e.g., from an earlier time period, such as a previous day, etc.), such may often be useful as an input for the algorithm. The outputs for the algorithm may include the determined locations of the stationary radar components SC, and may also include the determined position and orientation of the mobile radar configuration MRC and/or of the end tool ETL for each calibration position.

In various implementations, it will be appreciated that the SLAC algorithm (e.g., and/or other algorithms) may be utilized for performing a measurement process (e.g., during a measurement mode). Such a measurement process may be part of or an alternative to a calibration process (e.g., for which the corresponding measurement mode may be part of or an alternative to a calibration mode). In such implementations, the algorithm may determine the position and orientation of the mobile radar configuration MRC and/or of the end tool ETL, in addition to determining the locations of the stationary radar components SC. The algorithm may be based on an iterative solver which in some implementations may have sufficient speed to be utilized for "real-time" calibration while also preforming the measurement mode operations. In one implementation, determined distances (e.g., from a measurement process) as determined during a recent period of time (e.g., during a last hour) may be utilized for determining the locations of the stationary radar components SC (e.g., effectively utilizing recent measurement positions for which distances were determined as types of calibration positions). Such processing may help address issues and reduce certain impacts (e.g., related to slow drifts and/or environmental changes such as those resulting from day-night cycles, etc.)

In various implementations, calibration of the movement system 110 (e.g., including the movable mechanical configuration MAC) may also be performed. In general, accuracy for certain types of movable mechanical configurations MAC (e.g., robot arms, etc.) may be on the order of millimeters, and may require calibration to achieve sub-millimeter accuracy. In various implementations, the SLAC algorithm which may determine the location and orientation of the mobile radar configuration MRC and/or of the end tool ETL may be utilized to calibrate the movement system 110 (e.g., including the movable mechanical configuration MAC) at the same time.

Figure 18:
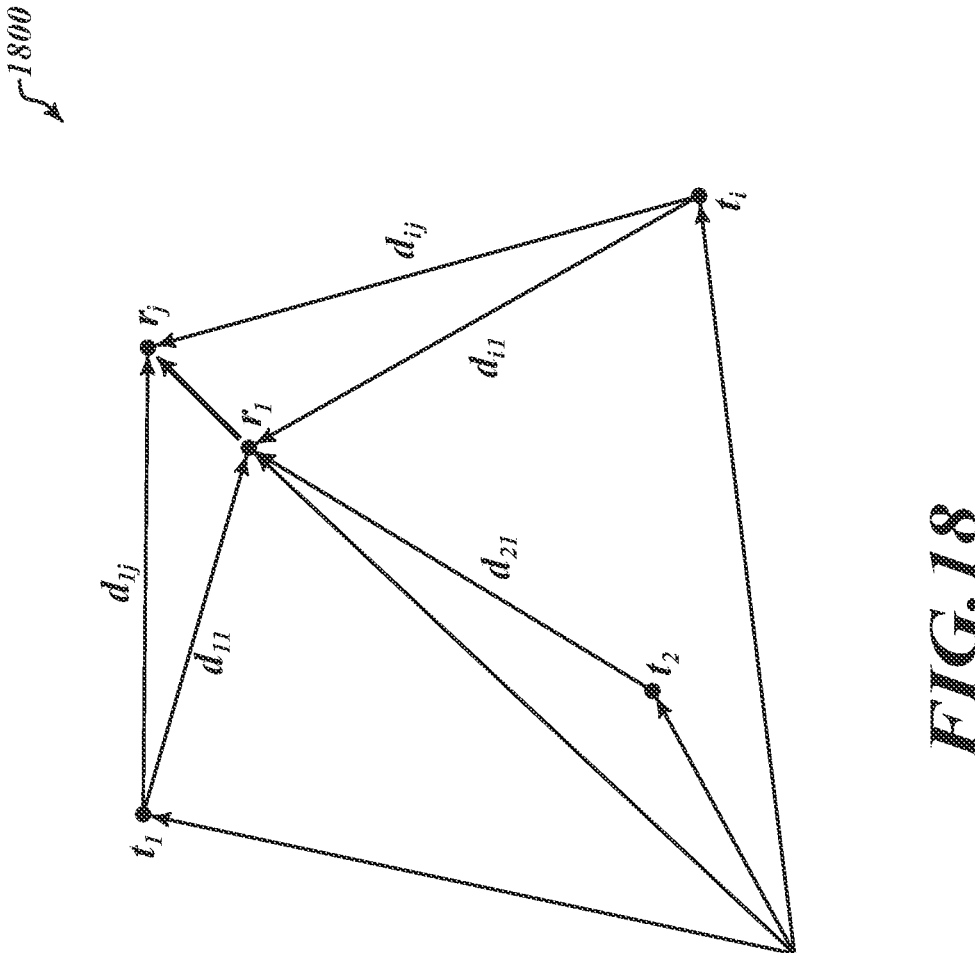
FIG. 18 is a diagram illustrating distances determined as part of a calibration process.

FIG. 18 is a diagram illustrating a set of distances 1800 corresponding to calibration positions (e.g., in relation to a further simplified explanation of the calibration process). In the example of FIG. 18, stationary radar components are radar transmitters, and mobile radar components are radar receivers. A number of example radar transmitter locations (e.g., radar transmitter locations $t_1$, $t_2$, and $t_i$) and calibration positions (e.g., calibration positions $r_i$ and $r_j$) are illustrated. Example distances $d_{11}$, $d_{21}$, and $d_{i1}$ are illustrated between the calibration position $r_i$ and the radar transmitter locations $t_1$, $t_2$, and $t_i$, respectively. Example distances $d_{1j}$ and $d_{ij}$ are illustrated between the calibration position $r_j$ and the radar transmitter locations $t_1$ and $t_i$, respectively. It will be appreciated that other distances may also or alternatively be determined, as well as for other calibration positions, but are not all included in the generalized representation and for purposes of simplifying the illustration of FIG. 18, similar to the example described above with respect to FIG. 17.

In one implementation, as part of a calibration process (e.g., in relation to a concept similar to that of multilatera-tion), the distance $d_{ij}$ (but not the direction) may be determined between pairs of stationary radar component locations (e.g., radar transmitter locations $t_i$, such as in terms of $x_i$, $y_i$, $z_i$ coordinates) and mobile radar component locations (e.g., radar transmitter locations, as may correspond to calibration positions $r_j$, such as in terms of $x_j$, $y_j$, $z_j$ coordinates). A corresponding equation may be represented as:

$$d_{ij} = |\vec{r_j} - \vec{t_i}| = \left\| \begin{pmatrix} x_j \\ y_j \\ z_j \end{pmatrix} - \begin{pmatrix} x_i \\ y_i \\ z_i \end{pmatrix} \right\| \quad \text{(Eq. 2)}$$

Without a loss of generality, in this illustration the cali-bration positions are considered only in terms of a single radar receiver that moves through the movement volume to each of the calibration positions. Aspects related to direc-tional antennas of the radar components (e.g., relating to reception cones, etc.) are also not represented/included in this simplified illustration. In various implementations, an objective of the calibration process may be to determine the locations of the stationary radar components (e.g., the radar transmitters) in an arbitrary reference frame $\Sigma$. In certain implementations, this may be accomplished by determining the distances between the stationary radar components (e.g., radar transmitters) and mobile radar component(s) (e.g., radar receivers), for a number of calibration positions. A general principle may be that despite the initially unknown locations (e.g., as either fully unknown or partially unknown in relation to some estimated and/or coarse starting location information) of the stationary radar components (e.g., radar transmitters) and calibration positions, the unknown vari-ables (e.g., including the x, y, z coordinates of the locations) eventually become solvable as known values may be accu-mulated at a faster rate than unknowns for each additional calibration position (e.g., for which distance information is determined at each calibration position).

In relation to such principles, as one simplified example, a radar metrology system may include a stationary radar configuration with 4 stationary radar components (e.g., radar transmitters). The location of each stationary radar compo-nent may be regarded as corresponding to 3 unknown values (e.g., corresponding to the $x_i$, $y_i$, $z_i$ coordinates of the location), and for which the configuration with 4 locations may thus correspond to 3×4=12 unknown values. In certain implementations, there may be the ability to choose the origin of the coordinate system, such that the location of one of the stationary radar components may be set as the origin, for which only the relative locations of the three remaining stationary radar components may need to be determined, as corresponding to 3×3=9 unknown values.

Each additional calibration position may add 3 more unknown values (i.e., as corresponding to the coordinates $x_j$, $y_j$, $z_j$). However, each additional calibration position may also add 4 known values (i.e., corresponding to the deter-mined distances between the calibration position and each of the 4 receivers). Thus, in this simplified example, known values are accumulated faster than unknown values for each additional calibration position (e.g., with 1 net known value added for each calibration position, for which the system becomes solvable after moving to 9 calibration positions, for solving for the initial 9 unknown values for the locations of the stationary radar components/radar transmitters).

As noted above, this example is simplified in several aspects, including considering only a single mobile radar component (e.g., radar receiver) at each calibration position (e.g., when in various implementations there may be mul-tiple mobile radar components as part of the mobile radar configuration). Conceptually it may be envisioned that tracking a single point may correspond to and/or otherwise be similar to tracking a reference point (e.g., the center point CENT) of the mobile radar configuration MRC and/or end tool ETL.

In various implementations, even after a sufficient number of known values have been accumulated for the system to be solvable (e.g., for the locations of the stationary radar components to be determined), additional calibration posi-tions may be utilized for accumulating additional known values (e.g., as may correspond to the system of equations becoming overdetermined). In various implementations, at least part of the output/result of the calibration process may be a solution (e.g., a least square solution or other solution) which includes utilization of the additional known values from the additional calibration positions. Experimental results have indicated additional improvement to accuracy when additional known values (e.g., determined distances, etc.) from additional calibration positions have been included (e.g., in a least square fit or as part of a different fitting method). Such results may be related to certain amounts of signal noise affecting the individual distance determinations and for which solving with the additional known values may result in averaging that helps reduce the effect of the random signal noise.

FIG. 19 is a flow diagram illustrating an exemplary implementation of a routine for performing a calibration process (e.g., for determining locations of stationary radar components of a radar metrology system). At a block 1910, a radar metrology system is provided comprising: a mobile radar configuration comprising a plurality of mobile radar components that are configured to be coupled to at least one of an end tool or an end tool mounting configuration of a movement system that moves the end tool; and a stationary radar configuration comprising a plurality of stationary radar components that define at least part of a metrology frame volume that surrounds at least part of a movement volume in which at least a portion of the end tool is moved. At a block 1920, the movement system is controlled to move the mobile radar configuration to a plurality of calibration positions. At a block 1930, for each calibration position, received radar signals are utilized to determine distances between stationary radar components of the stationary radar configuration and one or more mobile radar components of the mobile radar configuration, wherein the radar signals are at least one of transmitted from the stationary radar components and received by the one or more mobile radar components, or transmitted from the one or more mobile radar components and received by the stationary radar components. At a block 1940, locations (e.g., coordinates) are determined of the stationary radar components of the stationary radar configuration based at least in part on the determined distances.

The following describes various exemplary embodiments of the present disclosure with various features and elements annotated with reference characters (i.e., reference numerals and reference letters) found in FIGS. 1-19. It should be understood that the reference characters are added to indicate exemplary embodiments, and the features and elements are not limited to the particular embodiments illustrated in FIGS. 1-19.

As noted above, in various implementations of a radar metrology system 150, a calibration process may be performed (e.g., as performed by the radar metrology system 150, or more specifically by a processing portion of the system, such as the radar control and processing portion 180). The calibration process includes controlling the movement system 110 (e.g., through signals sent to the motion control and processing system 140) to move the mobile radar configuration MRC to a plurality of calibration positions CALP. For each calibration position CALP, received radar signals are utilized to determine distances D (e.g., similar to the distances D illustrated in FIGS. 3-6) between stationary radar components SC of the stationary radar configuration SRC and one or more mobile radar components MC of the mobile radar configuration MRC, wherein the radar signals are at least one of transmitted from the stationary radar components SC and received by the one or more mobile radar components MC, or transmitted from the one or more mobile radar components MC and received by the stationary radar components SC. Locations of the stationary radar components SC of the stationary radar configuration SRC are determined based at least in part on the determined distances D.

In various implementations, a first measurement process may be performed (e.g., by a processing portion) after the calibration process has been performed and the end tool ETL has been moved by the movement system 110 to a first measurement position (e.g., the position illustrated in FIG. 3). As part of the first measurement process, received radar signals are utilized to determine distances D between stationary radar components SC of the stationary radar configuration SRC and mobile radar components MC of the mobile radar configuration MRC (e.g., distances D11, D12, D21, D22, D33 and D43 of FIG. 3). The first measurement position and a first orientation of the end tool ETL are determined based at least in part on the determined distances D between stationary radar components SC and mobile radar components MC and based at least in part on the determined locations of the stationary radar components SC (i.e., as determined during the calibration process).

In various implementations, a second measurement process may be performed (e.g., by the processing portion) after the calibration process and the first measurement process have been performed and the end tool ETL has been moved by the movement system 110 to a second measurement position that is different than the first measurement position (e.g., the position illustrated in FIG. 4). As part of the second measurement process, received radar signals are utilized to determine distances between stationary radar components SC of the stationary radar configuration SRC and mobile radar components MC of the mobile radar configuration MRC (e.g., distances D11A, D22A, D33A and D44A of FIG. 4). A second measurement position and a second orientation of the end tool ETL are determined based at least in part on the determined distances between stationary radar components SC and mobile radar components MC and based at least in part on the determined locations of the stationary radar components SC (e.g., as determined during the calibration process).

In various implementations, each radar transmitter (e.g., as controlled by a control portion, such as radar control and processing portion 180) transmits a radar signal at a different frequency, and the transmitted radar signals comprise a first radar signal transmitted by a first radar transmitter (e.g., stationary radar component $SC_1$ in FIG. 3) at a first frequency, and a second radar signal transmitted by a second radar transmitter (e.g., stationary radar component SC2 in FIG. 3) at a second frequency that is different than the first frequency. In various implementations, the plurality of calibration positions CALP comprises a first calibration position CALP, and the determining of the distances for the first calibration position CALP (e.g., with the position illustrated in FIG. 3 as an example of a first calibration position) includes determining a first distance D11 and a second distance D22. The first distance D11 is between a first stationary radar component (e.g., stationary radar component SC1) and a first mobile radar component (e.g., mobile radar component MC1), wherein the first distance D11 is determined based at least in part on the first radar signal which is transmitted by the first radar transmitter (e.g., stationary radar component SC1) at the first frequency and received by the first radar receiver (e.g., mobile radar component MC1). The second distance D22 is between a second stationary radar component (e.g., stationary radar component SC2) and a second mobile radar component (e.g., mobile radar component MC2), wherein the second distance D22 is determined based at least in part on the second radar signal which is transmitted by the second radar transmitter (e.g., stationary radar component SC2) at the second frequency and received by the second radar receiver (e.g., mobile radar component MC2). In various implementations, a third distance D21 may be determined based at least in part on the first radar signal which is transmitted by the first radar transmitter (e.g., stationary radar component SC1) at the first frequency and received by the second radar receiver (e.g., mobile radar component MC2).

In various implementations, the determining of the end tool position comprises determining coordinates of the end tool ETL within a first coordinate system (e.g., a coordinate system of the radar metrology system 150 and/or of the movement system 110), and the determining of the locations of the stationary radar components SC comprises determining coordinates of the stationary radar components SC within the first coordinate system.

In various implementations, the determining of the locations of the stationary radar components SC of the stationary radar configuration SRC comprises utilization of a least squares method. In various implementations, the number of determined distances may correspond to an overdetermined system and the least squares method comprises determining a least squares solution for the overdetermined system.

In various implementations, when the mobile radar configuration MRC is in a first calibration position CALP and a first orientation (e.g., for which the position and orientation illustrated in FIG. 3 may be an example of a first calibration position CALP-1), the radar signals that are received correspond to a first set of distances (e.g., distances D11, D12, D21, D22, D33 and D43) between the mobile radar components MC (e.g., mobile radar components MC1, MC2, MC3 and MC4) and stationary radar components SC (e.g., stationary radar components SC1, SC2 and SC3) and which indicate that the mobile radar configuration MRC is in the first position and the first orientation. When the mobile radar configuration MRC is in a second calibration position CALP and a second orientation that are different than the first position and the first orientation (e.g., for which the position and orientation illustrated in FIG. 4 may be an example of a second calibration position CALP-2), the radar signals that are received correspond to a second set of distances (e.g., distances D11A, D22A, D33A and D44A) between the mobile radar components MC and stationary radar components SC and which indicate that the mobile radar configuration MRC is in the second position and the second orientation.

In various implementations, the one or more mobile radar components MC may include at least a first mobile radar component (e.g., mobile radar component MC1) and a second mobile radar component (e.g., mobile radar component MC2), and each of the mobile radar components MC is in a fixed relationship within the mobile radar configuration MRC with a fixed separation dimension (e.g., dimension SD12 illustrated in FIG. 1) between the first and second mobile radar components MC within the mobile radar configuration MRC, and for which the determining of the locations of the stationary radar components SC of the stationary radar configuration SRC is further based at least in part on the fixed separation dimension. For example, in FIG. 3, the distance D11 is between the radar components MC1 and SC1, and the distance D22 is between the radar components MC2 and SC2, and the dimension SD12 is between the mobile radar components MC1 and MC2 (i.e., as illustrated in FIG. 1) and is included as a factor (e.g., a known dimension and/or spatial relationship between MC1 and MC2) in determining the relative locations of the stationary radar components SC1 and SC2.

In various implementations, the determining of the distances is further based at least in part on: determining a number of wavelengths (e.g., an integer number of wavelengths) of each received radar signal as occurring between the corresponding radar transmitter and the corresponding radar receiver; and determining a phase of each received radar signal. In various implementations, the motion control system 140 is configured to sense a position of the end tool ETL based at least in part on using a plurality of position sensors (e.g., position sensors SEN1-SEN5) included in the movable mechanical configuration MAC, and the determining of the number of wavelengths of each received radar signal is based at least in part on the position as sensed by the motion control system 140.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A radar metrology system for use with a movement system that moves an end tool, the movement system comprising:

a movable mechanical configuration comprising an end tool mounting configuration that an end tool is configured to mount to; and a motion control system configured to control an end tool position and orientation, based at least in part on controlling the movable mechanical configuration so as to move at least a portion of an end tool that is mounted to the end tool mounting configuration within a movement volume, the radar metrology system comprising:

a mobile radar configuration comprising a plurality of mobile radar components that are configured to be coupled to at least one of the end tool or the end tool mounting configuration;

a stationary radar configuration comprising a plurality of stationary radar components that define at least part of a metrology frame volume that surrounds at least part of the movement volume in which at least a portion of the end tool is moved; and a processing portion configured to determine distances between stationary radar components and mobile radar components based at least in part on radar signals, wherein the determined distances indicate a position and orientation of at least one of the mobile radar configuration or end tool, and the radar signals are either:

transmitted from the stationary radar components and received by the mobile radar components, for which the stationary radar components are radar transmitters and the mobile radar components are radar receivers; or transmitted from the mobile radar components and received by the stationary radar components, for which the mobile radar components are radar transmitters and the stationary radar components are radar receivers;

wherein:

the determining of the distances between stationary radar components and mobile radar components is based at least in part on determining a number of wavelengths of each received radar signal as occurring between the corresponding radar transmitter and the corresponding radar receiver;

a first received radar signal as occurring between a first radar transmitter and a first radar receiver has a number of wavelengths that comprises an integer number of the wavelengths and a fractional portion of the wavelength;

the motion control system is configured to sense a position of the end tool based at least in part on using a plurality of position sensors included in the movable mechanical configuration, wherein the plurality of position sensors are in the movable mechanical configuration and are at different locations than the stationary radar components of the stationary radar configuration and the mobile radar components of the mobile radar configuration, and each position sensor of the plurality of position sensors is an encoder which provides position information without utilizing radar signals and which is included in the movable mechanical configuration, and a determining of the integer number of the wavelengths of the first received radar signal is based at least in part on the position information from the plurality of encoders included in the moveable mechanical configuration; and a determining of the fractional portion of the wavelength is based at least in part on the phase of the first received radar signal and is not based on position information from the plurality of encoders included in the moveable mechanical configuration.

2. The radar metrology system of claim 1, wherein the processing portion is further configured to determine a position and orientation of at least one of the mobile radar configuration or end tool based at least in part on the determined distances between stationary radar components and mobile radar components.

3. The radar metrology system of claim 1, wherein each radar transmitter transmits a radar signal at a different frequency, and the transmitted radar signals comprise a first radar signal transmitted by the first radar transmitter at a first frequency, and a second radar signal transmitted by a second radar transmitter at a second frequency that is different than the first frequency.

4. The radar metrology system of claim 3, wherein the determining of the distances comprises:

determining a first distance between a first stationary radar component and a first mobile radar component which are either the first radar transmitter and the first radar receiver, or the first radar receiver and the first radar transmitter, respectively, wherein the first distance is determined based at least in part on the first radar signal which is transmitted by the first radar transmitter at the first frequency and received by the first radar receiver; and determining a second distance between a second stationary radar component and a second mobile radar component which are either the second radar transmitter and a second radar receiver, or a second radar receiver and the second radar transmitter, respectively, wherein the second distance is determined based at least in part on the second radar signal which is transmitted by the second radar transmitter at the second frequency and received by the second radar receiver.

5. The radar metrology system of claim 4, wherein the determining of the distances further comprises:

determining a third distance based at least in part on the first radar signal which is transmitted by the first radar transmitter at the first frequency and received by the second radar receiver.

6. The radar metrology system of claim 4, wherein the processing portion is further configured to determine a position and orientation of at least one of the mobile radar configuration or end tool based at least in part on the first determined distance between the first stationary radar component and the first mobile radar component and the second determined distance between the second stationary radar component and the second mobile radar component.

7. The radar metrology system of claim 1, wherein the movable mechanical configuration is a moveable arm configuration.

8. The radar metrology system of claim 1, wherein the plurality of stationary radar components comprises at least three stationary radar components.

9. The radar metrology system of claim 1, wherein the plurality of stationary radar components comprises at least eight stationary radar components.

10. The radar metrology system of claim 1, wherein the plurality of mobile radar components comprises at least four mobile radar components.

11. The radar metrology system of claim 1, wherein each mobile radar component comprises a directive antenna.

12. The radar metrology system of claim 1, wherein:

when the end tool is in a first position and a first orientation, the radar signals that are received correspond to a first set of distances between the mobile radar components and stationary radar components and which indicate that the end tool is in the first position and the first orientation; and when the end tool is in a second position and a second orientation that are different than the first position and the first orientation, the radar signals that are received correspond to a second set of distances between the mobile radar components and stationary radar components and which indicate that the end tool is in the second position and the second orientation.

13. The radar metrology system of claim 1, wherein the plurality of mobile radar components comprises a first mobile radar component and the plurality of stationary radar components comprises a first stationary radar component, and the processing portion is configured to:

determine that the first mobile radar component is at a first distance from the first stationary radar component when the end tool is in a first position and in a first orientation, for which the determination of the first distance is based at least in part on processing a radar signal that is either transmitted from the first stationary radar component and received by the first mobile radar component, or transmitted from the first mobile radar component and received by the first stationary radar component, while the end tool is in the first position and first orientation.

14. The radar metrology system of claim 13, wherein the processing portion is further configured to:

determine that the first mobile radar component is at a second distance from the first stationary radar component that is different from the first distance when the end tool is in a second position and in a second orientation, for which the determination of the second distance is based at least in part on processing a radar signal that is either transmitted from the first stationary radar component and received by the first mobile radar component, or transmitted from the first mobile radar component and received by the first stationary radar component, while the end tool is in the second position and second orientation.

15. The radar metrology system of claim 1, wherein:

the motion control system is configured to sense and control a position and orientation of the end tool with a level of accuracy defined as a movement system accuracy, based at least in part on sensing and controlling the position and orientation of the end tool using the plurality of encoders included in the movable mechanical configuration and not based on the determined distances between stationary radar components and mobile radar components; and the processing portion is operable to determine a position and orientation of the end tool with an accuracy level that is better than the movement system accuracy, based at least in part on the determined distances between stationary radar components and mobile radar components.

16. The radar metrology system of claim 1, wherein the determining of the distances is further based at least in part on determining a phase of each received radar signal.

17. The radar metrology system of claim 1, wherein:
the mobile radar configuration is a radar receiver configuration and the mobile radar components are radar receivers; and
the stationary radar configuration is a radar transmitter configuration and the stationary radar components are radar transmitters.

18. The radar metrology system of claim 1, wherein each encoder of the plurality of encoders in the movable mechanical configuration is a rotary encoder which provides position information that is not based on radar signals, and the determining of the integer number of the wavelengths of the first received radar signal is based at least in part on the position information from the rotary encoders that is not based on radar signals.

19. A method for operating a radar metrology system for use with a movement system that moves an end tool, the radar metrology system comprising:
a mobile radar configuration comprising a plurality of mobile radar components that are configured to be coupled to at least one of the end tool or an end tool mounting configuration of the movement system that moves the end tool; and
a stationary radar configuration comprising a plurality of stationary radar components that define at least part of a metrology frame volume that surrounds at least part of a movement volume in which at least a portion of the end tool is moved;
the method comprising:
determining distances between stationary radar components and mobile radar components based at least in part on radar signals, wherein the determined distances indicate a position and orientation of at least one of the mobile radar configuration or end tool, and the radar signals are either:
transmitted from the stationary radar components and received by the mobile radar components, for which the stationary radar components are radar transmitters and the mobile radar components are radar receivers; or
transmitted from the mobile radar components and received by the stationary radar components, for which the mobile radar components are radar transmitters and the stationary radar components are radar receivers; and
determining a position and orientation of at least one of the mobile radar configuration or end tool based at least in part on the determined distances between stationary radar components and mobile radar components;

wherein:
the determining of the distances between stationary radar components and mobile radar components is based at least in part on determining a number of wavelengths of each received radar signal as occurring between the corresponding radar transmitter and the corresponding radar receiver;
a first received radar signal as occurring between a first radar transmitter and a first radar receiver has a number of wavelengths that comprises an integer number of the wavelengths and a fractional portion of the wavelength;
the movement system that that moves the end tool is configured to sense a position of the end tool based at least in part on using a plurality of position sensors included in the movement system, wherein the plurality of position sensors are at different locations than the stationary radar components of the stationary radar configuration and the mobile radar components of the mobile radar configuration, and each position sensor of the plurality of position sensors is an encoder which provides position information without utilizing radar signals and which is included in the movement system that moves the end tool, and a determining of the integer number of the wavelengths of the first received radar signal is based at least in part on the position information from the plurality of encoders included in the movement system; and
a determining of the fractional portion of the wavelength is based at least in part on the phase of the first received radar signal and is not based on position information from the plurality of encoders included in the movement system.

20. The method of claim 19, further comprising controlling either the plurality of stationary radar components, or the plurality of mobile radar components, to generate the transmitted radar signals, wherein the transmitted radar signals each have a different frequency, and the transmitted radar signals comprise a first radar signal with a first frequency, and a second radar signal with a second frequency that is different than the first frequency.

21. The method of claim 20, wherein the determining of the distances comprises:
determining a first distance between a first stationary radar component and a first mobile radar component based at least in part on the first radar signal with the first frequency which is either transmitted by the first stationary radar component and received by the first mobile radar component, or transmitted by the first mobile radar component and received by the first stationary radar component; and
determining a second distance between a second stationary radar component and a second mobile radar component based at least in part on the second radar signal with the second frequency which is either transmitted by the second stationary radar component and received by the second mobile radar component, or transmitted by the second mobile radar component and received by the second stationary radar component.

22. The method of claim 19, wherein each encoder of the plurality of encoders included in the movement system is a rotary encoder which provides position information that is not based on radar signals, and the determining of the integer number of the wavelengths of the first received radar signal is based at least in part on the position information from the rotary encoders that is not based on radar signals.

23. A radar metrology system, comprising:

a mobile radar configuration comprising a plurality of mobile radar components that are configured to be coupled to at least one of an end tool or an end tool mounting configuration of a movement system that moves the end tool; and a stationary radar configuration comprising a plurality of stationary radar components that define at least part of a metrology frame volume that surrounds at least part of a movement volume in which at least a portion of the end tool is moved; and wherein the radar metrology system is configured to:

determine distances between stationary radar components and mobile radar components based at least in part on radar signals, wherein the determined distances indicate a position and orientation of at least one of the mobile radar configuration or end tool, and the radar signals are either:

transmitted from the stationary radar components and received by the mobile radar components, for which the stationary radar components are radar transmitters and the mobile radar components are radar receivers; or transmitted from the mobile radar components and received by the stationary radar components, for which the mobile radar components are radar transmitters and the stationary radar components are radar receivers; and determine a position and orientation of at least one of the mobile radar configuration or end tool based at least in part on the determined distances between stationary radar components and mobile radar components;

wherein:

the determining of the distances between stationary radar components and mobile radar components is based at least in part on determining a number of wavelengths of each received radar signal as occurring between the corresponding radar transmitter and the corresponding radar receiver;

a first received radar signal as occurring between a first radar transmitter and a first radar receiver has a number of wavelengths that comprises an integer number of the wavelengths and a fractional portion of the wavelength;

the movement system that that moves the end tool is configured to sense a position of the end tool based at least in part on using a plurality of position sensors included in the movement system, wherein the plurality of position sensors are at different locations than the stationary radar components of the stationary radar configuration and the mobile radar components of the mobile radar configuration, and each position sensor of the plurality of position sensors is an encoder which provides position information without utilizing radar signals and which is included in the movement system that moves the end tool, and a determining of the integer number of wavelengths of the first received radar signal is based at least in part on the position information from the plurality of encoders included in the movement system; and a determining of the fractional portion of the wavelength is based at least in part on the phase of the first received radar signal and is not based on position information from the plurality of encoders included in the movement system.

* * * * *